(12) United States Patent
Zubair et al.

(10) Patent No.: US 11,714,725 B2
(45) Date of Patent: Aug. 1, 2023

(54) SYSTEM AND METHOD FOR ULTRA-LOW OVERHEAD AND RECOVERY TIME FOR SECURE NON-VOLATILE MEMORIES

(71) Applicant: UNIVERSITY OF CENTRAL FLORIDA RESEARCH FOUNDATION, INC., Orlando, FL (US)

(72) Inventors: Kazi Abu Zubair, Orlando, FL (US); Amro Awad, Orlando, FL (US)

(73) Assignee: UNIVERSITY OF CENTRAL FLORIDA RESEARCH FOUNDATION, INC., Orlando, FL (US)

( * ) Notice: Subject to any disclaimer, the term of this patent is extended or adjusted under 35 U.S.C. 154(b) by 254 days.

(21) Appl. No.: 16/892,019

(22) Filed: Jun. 3, 2020

(65) Prior Publication Data

US 2020/0379854 A1 Dec. 3, 2020

Related U.S. Application Data

(60) Provisional application No. 62/856,343, filed on Jun. 3, 2019.

(51) Int. Cl.
*G06F 11/00* (2006.01)
*G06F 11/14* (2006.01)
*G06F 12/0815* (2016.01)

(52) U.S. Cl.
CPC ...... *G06F 11/1469* (2013.01); *G06F 12/0815* (2013.01); *G06F 2201/82* (2013.01); *G06F 2212/1021* (2013.01)

(58) Field of Classification Search
CPC ............ G06F 11/1469; G06F 12/0815; G06F 2201/82; G06F 2212/1021
See application file for complete search history.

(56) References Cited

U.S. PATENT DOCUMENTS 5,043,885 A * 8/1991 Robinson .............. G06F 12/124
711/136
7,024,545 B1 * 4/2006 Zuraski, Jr. ........... G06F 9/3848
712/240

(Continued)

OTHER PUBLICATIONS https://www.forbes.com/sites/kellyclay/2013/08/19/amazon-com-goes-down-loses-66240-per-minute/; Aug. 19, 2013, 4 pages.

(Continued)

*Primary Examiner* — Loan L. T. Truong
(74) *Attorney, Agent, or Firm* — Timothy H. Van Dyke; Wolter, Van Dyke, Davis, PLLC

(57) ABSTRACT

A device comprising a memory controller coupled to a non-volatile memory (NVM) device with a shadow tracker memory region. The controller comprises a low-overhead and low recovery time for integrity-protected systems by recovering a secure metadata cache. The controller is configured to persistently track addresses of blocks in the secure metadata cache in the NVM device when a miss occurs, and track the persistent addresses, after the miss. The controller is configured to rebuild affected parts of the secure metadata cache associated with the persistent addresses in the NVM device. A system is provided which includes the memory controller interfaced with an NVM device with the shadow tracker memory region.

20 Claims, 20 Drawing Sheets

(56) References Cited

U.S. PATENT DOCUMENTS

| | | | |
|---|---|---|---|
| 7,581,064 B1* | 8/2009 | Zedlewski | G06F 12/084 |
| | | | 711/119 |
| 9,612,757 B2 | 4/2017 | Chakrabarti | |
| 10,127,968 B2 | 11/2018 | Edirisooriya et al. | |
| 10,528,485 B2* | 1/2020 | Chhabra | H04L 9/0643 |
| 10,733,105 B1* | 8/2020 | Visvanathan | G06F 3/0611 |
| 10,908,818 B1* | 2/2021 | Visvanathan | G06F 3/0619 |
| 10,936,412 B1* | 3/2021 | Visvanathan | G06F 12/0866 |
| 11,068,299 B1* | 7/2021 | Armangau | G06F 3/0688 |
| 11,281,545 B2* | 3/2022 | Solihin | G06F 12/0246 |
| 2012/0054447 A1* | 3/2012 | Swart | G06F 12/121 |
| | | | 711/136 |
| 2017/0277709 A1* | 9/2017 | Strauss | G06F 3/0604 |
| 2018/0046556 A1* | 2/2018 | Marathe | G06F 11/1004 |
| 2018/0210531 A1* | 7/2018 | Shahneous Bari | G06F 3/0679 |
| 2018/0218005 A1* | 8/2018 | Kuhtz | G06F 8/71 |
| 2020/0042343 A1* | 2/2020 | Wang | G06F 9/45558 |
| 2022/0414017 A1* | 12/2022 | Dua | G06F 12/0897 |

OTHER PUBLICATIONS

Awad, Amro et al. "Silent Shredder: Zero-Cost Shredding for Secure Non-Volatile Main Memory Controllers", ASPLOS'16, Apr. 2016, 14 pages.

Binkert, Nathan et al., "The gem5 Simulator", ACM SIGARCH Computer Architecture News, May 2011, vol. 39, No. 2, 7 pages.

Chen, E. et al., "Advances and Future Prospects of Spin-Transfer Torque Random Access Memory", IEEE Transactions on Magnetics, Jun. 2010, vol. 46, No. 6, pp. 1873-1878.

Coburn, Joel et al., "NV-Heaps: Making Persistent Objects Fast and Safe with Next-Generation, Non-Volatile Memories", ASPLOS'11, Mar. 2011, 13 pages.

Cohen, Nachshon et al., "Object-Oriented Recovery for Non-volatile Memory", Proc. ACM Program. Lang., Nov. 2018, vol. 2. No. OOPSLA, Article 153, 21 pages.

Decarellan, "Enhancing High-Performance Computing with Persistent Memory Technology", Published Dec. 21, 2017; 14 pages.

Gueron, Shay, "A Memory Encryption Engine Suitable for General Purpose Processors", Feb. 25, 2016, 14 pages.

Henning, J.L., "SPEC CPU 1006 Benchmark Descriptions", ACM SIGARCH Computer Architecture News, 2006, vol. 34, No. 4, 17 pages.

Kolli, A. et al., "Language-level persistency", ISCA Toronto, Ontario Canada, Jun. 2017, pp. 481-493.

Lee, Benjamin C. et al., "Phase-Change Technology and the Future of Main Memory", IEEE Micro, 2010, pp. 131-141.

Lee, Benjamin C. et al., "Architecting Phase Change Memory as a Scalable DRAM Alternative", ISCA 2009, Austin, Texas, 12 pages.

Li, Zhongqi et al., "Exploring High-Performance and Energy Proportional Interface for Phase Change Memory Systems", IEEE, 2013, 12 pages.

Liu, Tz-yi et al., "A 130.7-mm2 2-Layer 32-GB ReRAM Memory Device in 24-nm Technology", IEEE Journal of Solid-State Circuits, vol. 49, No. 1, Jan. 2014, pp. 140-153.

Liu, Sihang et al., "Crash Consistency in Encrypted Non-Volatile Main Memory Systems", 14 pages.

Ren, Jinglei et al., "ThyNVM: Enabling Software-Transparent Crash Consistency in Persistent Memory Systems", MICRO-48, Dec. 5-9, 2015, Waikiki, HI, 14 pages.

Rogers, Brian et al., "Using Address Independent Seed Encryption and Bonsai Merkle Trees to Make Secure Processors OS- and Performance-Friendly", IEEE/ACM International Symposium on Microarchitecture, Dec. 2007, 13 pages.

Rudoff, Andy M., "Deprecating the PCOMMIT Instruction", https://software.intel.com/content/www/us/en/develop/blogs/deprecate-pcommit-instruction.html, Published Sep. 12, 2016, 7 pages.

Saileshwar, G. et al., "Morphable Counters: Enabling Compact Integrity Trees For Low-Overhead Secure Memories", IEEE/ACM International Symposium on Microarchitecture; 2018, 12 pages.

Saileshwar, G. et al., "SYNERGY: Rethinking Secure-Memory Design for Error-Correcting Memories", IEEE International Symposium on High Performance Computer Architecture, 2018, 12 pages.

Swift, Michael M. "Towards O(1) Memory", HotOS, May 2017, Whistler, BC, Canada. 5 pages.

Taassori, M. et al., "VAULT: Reducing Paging Overheads in SGX with Efficient Integrity Verification Structures", ASPLOS Mar. 2018, Williamsburg, VA 14 pages.

Yan, Chenyu et al., "Improving Cost, Performance, and Security of Memory Encryption and Authentication", International Symposium on Computer Architecture, 2006, 12 pages.

Ye, Mao et al., "Osiris: A Low-Cost Mechanism to Enable Restoration of Secure Non-Volatile Memories", 13 pages.

Zhao, Jishen et al., "Kiln: Closing the Performance Gap Between Systems With and Without Persistence Support", MICRO-46, Dec. 2013, Davis, CA, 12 pages.

Zhou, Ping et al., "A Durable and Energy Efficient Main Memory Using Phase Change Memory Technology", ISCA Jun. 2009, Austin, Texas, 14 pages.

Zuo, Pengfei et al., "SecPM: a Secure and Persistent Memory System for Non-volatile Memory", 7 pages.

\* cited by examiner

1000A

Algorithm 1: AGIT Recovery

1  Read *SCT* and *SMT*;
2  for *SCT$_i$* in *SCT* do
3     Read Counter Block at address stored in *SCT$_i$*;
4     for *Counter* in *CounterBlock$_i$* do
5       Read *DataBlock$_i$*;
6       Fix *Counter* using Osiris;
7     end
8  end
9  Classify SMT entries based on their level in tree;
10 *MaxLevel* ← Total Merkle Tree Levels;
11 *AffectedNodes$_m$* ← Total Affected Nodes at Level m;
12 m ← 0;
13 for *m* ≤ *MaxLevel* do
14    for *Node* in *AffectedNodes$_m$* do
15      Read all child nodes of *Node*;
16      Create hash of child nodes and replace *Node*;
17    end
18    m ← m + 1;
19 end
20 if *Stored root matches new root* then
21    System recovered;
22 else
23    System is unrecoverable;
24 end

FIG. 10A

Algorithm 2: ASIT Recovery

1  Read $ST$;
2  Regenerate $SHADOW\_TREE\_ROOT$ and verify;
3  _Recover Tree Nodes_
4  for all $ST_i$ in $ST$ do
5      $State\_Node_i \leftarrow$ Read node at address($ST_i$) and place in cache;
6      $Recovered\_Node_i \leftarrow$ Replace LSBs and MAC in $State\_Node_i$ from $ST_i$;
7  end
8  _Verify Integrity_
9  for all $Recovered\_Node_i$ in $Metadata\_Cache$ do
10     $Verify\_Integrity(Recovered\_Node_i)$
11     if $Integrity\_Not\_Verified(Recovered\_Node_i)$ then
12         System is unrecoverable;
13     else
14         Do Nothing;
15     end
16 end

FIG. 10B

SYSTEM AND METHOD FOR ULTRA-LOW OVERHEAD AND RECOVERY TIME FOR SECURE NON-VOLATILE MEMORIES

The present application claims priority to the provisional application filed on Jun. 3, 2019, assigned application No. 62/856,343, and entitled System and Method for Ultra-Low Overhead and Recovery Time for Secure Non-Volatile Memories, which is incorporated by reference herein in its entirety.

BACKGROUND

Embodiments of the invention relate to systems and methods for ultra-low overhead and recovery time for secure non-volatile memories (NVMs).

Implementing secure Non-Volatile Memories (NVMs) is challenging, mainly due to the necessity to persist security metadata (e.g., encryption counters and a Merkle tree nodes) along with the data. Both data and metadata are typically stored in the NVM. Unlike conventional secure memories, NVM-equipped systems are expected to recover data after crashes and hence the security metadata must be recoverable as well. While prior work in this area has explored recovery of encryption counters less effort has been focused on complete recovery of these integrity-protected systems.

Generally, the present invention. relates to recovery of the security metadata, not the data itself. It is assumed that implementations and techniques for recovery of the data are available. In particular, little effort has been directed to techniques to recover the Merkle Tree (MT, which is further described below). Two major challenges have been observed.

First, recovering parallelizable trees, e.g., Intel's SGX (Software Guard eXtension) trees, requires very special handling due to its inter-level dependency. Second, recovery time for typical NVM sizes (terabytes are expected) would take hours. Most data centers, cloud systems, intermittent-power devices and even personal computers, are expected to recover almost instantly after power restoration. In fact, quick recovery is one of the major promises of NVMs.

It is noted that in high performance systems, the metadata are cached in dedicated cache structures called a 'Metadata Cache.' These caches do not provide non-volatile storage. Thus, if a power loss or crash occurs, any metadata that are in NVM are retained, but metadata that the processor had loaded in the cache or updated to the cache are lost.

Emerging Non-Volatile Memories (NVMs), such as Phase-Change Memory (PCM), are considered promising contenders for replacing DRAM due to their scalability, non-volatility, ultra-low idle power, and low latency. On the other hand, these emerging NVMs bring a new set of challenges for memory management and security; since NVMs retain data even after a power loss, necessary measures for securing the NVM data are needed, which requires additional security metadata. However, it is a major challenge to guarantee crash consistency and persistence of the security metadata if a volatile cache is used to cache security metadata.

Implementing an integrity tree (also referred to as a Merkle Tree or MT) with NVM memory systems is particularly challenging; updates to MT counters result in updating all levels of the Merkle Tree up to the root. Thus, to ensure consistency after a crash, such updates need to occur atomically. Second, since NVMs are slow and power-consuming, and can sustain a limited number of write operations, updating all levels (there can be tens of levels) of a Merkle Tree on each counter update is impractical. Third, in some integrity trees, such as an SGX-style integrity tree that offers parallel updates, recovering the tree by relying on recovering the leaves (e.g., counters) is infeasible. Finally, it is necessary to reconstruct the Merkle Tree after a system crash before accessing the memory. However, for terabytes of memory, such recovery process can take many hours. Practical NVM capacities are expected to reach terabytes per DIMM. For instance, Intel's Xeon server is expected to be equipped with a 6 TB NVM memory.

Some available solutions use either log-based persistence techniques or maintain snapshots of the system, thereby incurring high performance overhead. A few solutions manage the persistence with low overhead, but at the cost of very high recovery time.

SUMMARY OF THE INVENTION

Embodiments of the present invention relate to a system and method providing ultra-low overhead and recovery time for use with secure non-volatile memories (NVMs). A device comprising a memory controller is coupled to the NVM. The memory controller operates with low-overhead and low recovery time for integrity-protected systems by recovering a secure metadata cache. The controller is configured to persistently track or store addresses of blocks in the secure metadata cache in a shadow tracker memory region of the NVM. These addresses will then be available in the NVM when a miss occurs, that is, where a miss or a miss event refers to a cache miss event in the metadata cache. When trying to encrypt/decrypt/verify data, the system looks in the metadata cache for the associated metadata, using the address of the metadata. For example, if the system wants to verify data X, it needs metadata Y at memory address Y_addr. The system looks into the cache to find the metadata with address Y_addr. If the Y_addr is not found a cache miss has occurred and Y_addr is logged in the shadow tracker memory to track the persistent addresses after the miss. The controller is further configured to rebuild affected parts of the security metadata (stored in the cache) that are associated with the persistent addresses that had been stored in the shadow tracker memory.

Returning to the example, since the shadow tracker memory logged Y_addr, it is known that after a system crash the metadata Y had been in the cache. This information helps the system pinpoint specific metadata to fix or recover (Y in this case). Although recalculating metadata values is possible, the process takes hours if specific lost metadata is not known and thus all metadata must be fixed or repaired. For example, BMT (Bonsai Merkle Tree) nodes can be recalculated by hashing its children. But again, this is a time-consuming process.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIG. 10A illustrates a sequence of instructions of a process for AGIT recovery;

FIG. 10B illustrates a sequence of instructions of a process for ASIT recovery;

DETAILED DESCRIPTION OF THE INVENTION

Figures 1, 2:
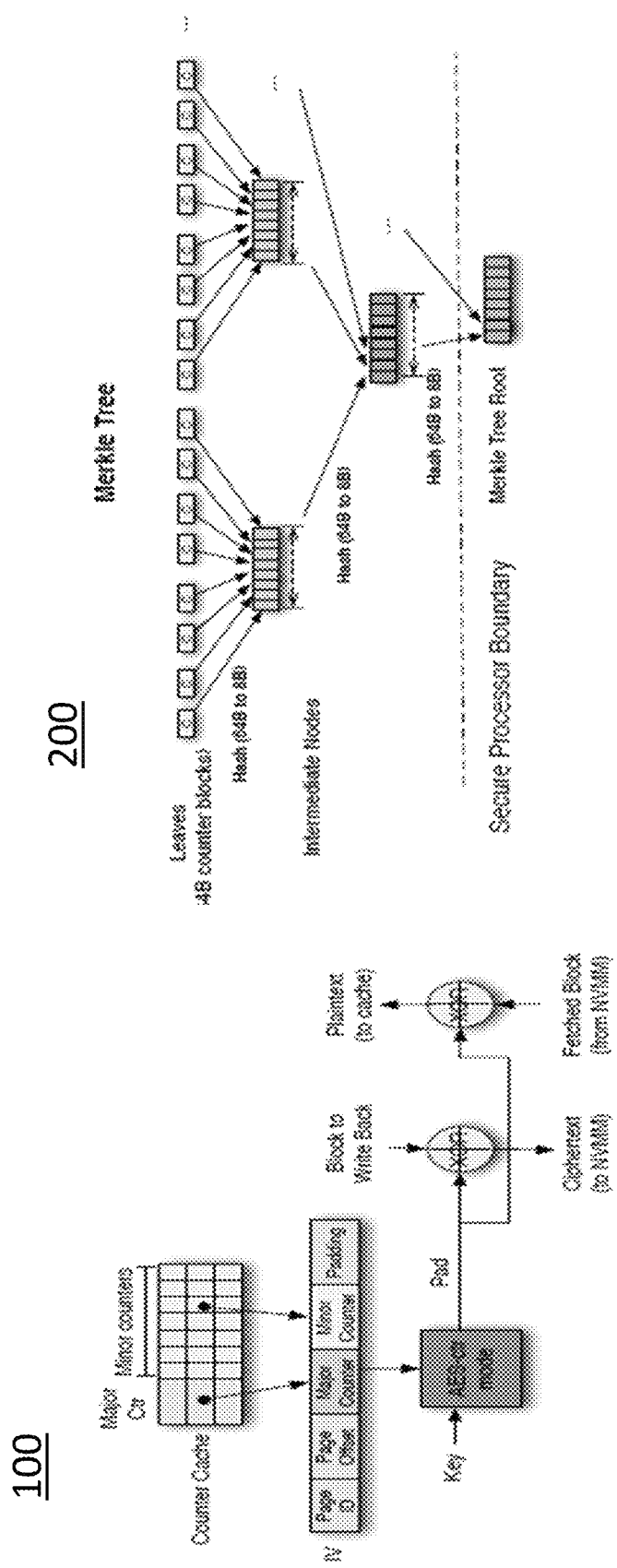
FIG. 1 illustrates Counter-Mode Encryption in state-of-the-art secure memories.
FIG. 2 illustrates a non-parallelizable Merkle Tree scheme.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications only for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

The main source of the security metadata crash inconsistency problem is the not-yet-persisted updates to the Merkle Tree and the encryption counters. In conventional integrity-protected systems, most of these updates occur in volatile caches inside the processor chip, but without strictly persisting them in memory. Thus, after a crash occurs, the security metadata written to memory uses counter and Merkle Tree values that have not yet been reflected in memory. That is, the data was written to memory before the crash, but the security data had not been written and was present in a volatile cache. Therefore, after recovery there will be an inconsistency between data stored in memory and the security metadata associated with that data.

While strictly persisting updates to such security metadata would eliminate this problem, but at the cost of tens of additional memory writes per normal write. Given the limited write-endurance (i.e., the number of read/write cycles that can be applied to a memory block before the block becomes unreliable), and very slow NVM writes, such a solution (that is, strict persistence) is considered impractical. Meanwhile, since encryption counters and Merkle Tree caches can hold hundreds of thousands of security metadata cache blocks, guaranteeing enough power to ensure flushing the content of the cache blocks (i.e., writing the cache contents to memory is impractical. In fact, state-of-the art processors have a limited number of entries (only tens of write entries) that are guaranteed to be persisted by the system. For instance, in recent Intel processors, a small buffer (tens of entries) co-located with the memory controller is called a Write Pending Queue (WPQ) and a write operation is considered persistent once it reaches that WPQ buffer. Such a guarantee is based on a system feature called Asynchronous DRAM Self-Refresh (ADR) that guarantees enough power to flush the contents of the WPQ (i.e., the data may reside in the cache or WPQ for a period of time, then the data is forced to the NVM). Thus, given the limitations of the ADR feature, high costs of uninterruptible power supplies, the demand for battery-free solutions, area and environmental constraints, it is important to innovate new mechanisms to ensure persistence of security metadata.

One solution suggested is referred to as Osiris, (by M. Ye, C. Hughes, and A. Awad, "Osiris: A low-cost mechanism to enable restoration of secure non-volatile memories," in 51st Annual IEEE/ACM International Symposium on Microarchitecture (MICRO 2018), 2018) enables recovery of encryption counters (the leaves of a Merkle Tree) through leveraging ECC (error correcting code) bits to identify the most recent counter value that was used for encryption.

While Osiris relies on the Merkle Tree for final verification of the candidate counter values, it overlooks the issue associated with recoverability of the Merkle Tree. However, similar to any other counter recovery scheme, Osiris's solution would take hours to recover the system after a crash. Before completing the first memory access after a crash counter recovery schemes need to fix the counters and then build up the whole Merkle Tree and all the counters (leaves), requiring iterating over a huge number of memory blocks. Moreover, Osiris does not consider the case where recovering encryption counters alone is insufficient to reconstruct some Merkle Trees elements, such as in commercial secure processors that use special MTs where just hashing is not enough to recover the intermediate nodes; other information is lost in the crash and cannot be recovered.

It is also known to use selective persistence, which relaxes atomic persistence of encryption counters for non-persistent data through software modifications and an API. However, selective persistence can lead to certain security vulnerabilities, its overhead scales with the amount of persistent data, obviously fails to ensure recoverability of parallelizable trees, and also incurs significant overhead for reconstructing the Merkle Tree. In both of these techniques, (e.g., Osiris and selective persistence) the Merkle Tree reconstruction has been overlooked and neither its recoverability nor its recovery time (with currently available capacities) have been considered or discussed in the literature.

Figure 6A:
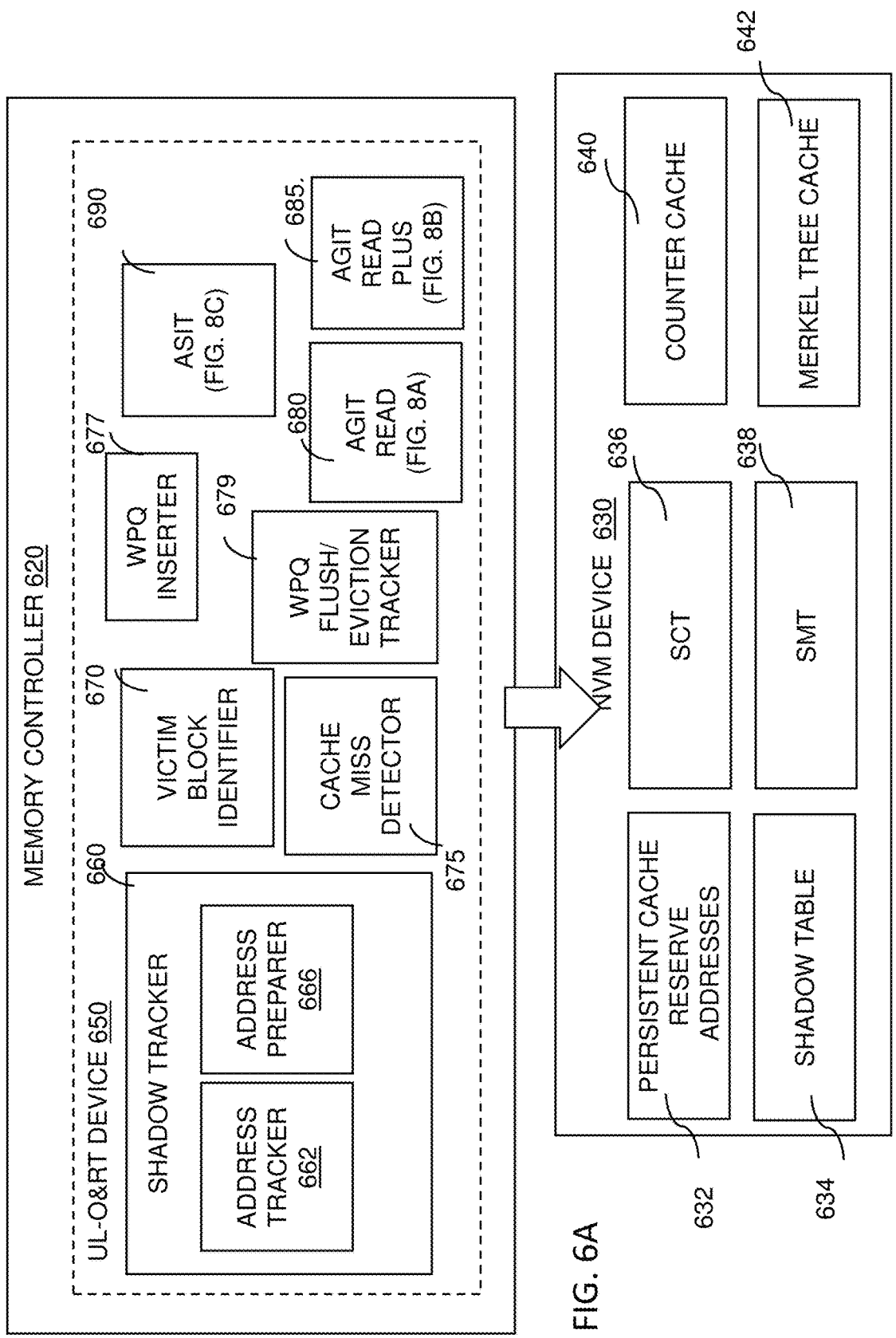
FIG. 6A illustrates a block diagram of a memory system with an ultra-low overhead and recovery time (UL-O&RT) device.

FIG. 6A illustrates a block diagram of a memory system 600A including an ultra-low overhead and recovery time (UL-O&RT) device 650, according to the present invention. The memory system 600A may include a memory controller 620 and a non-volatile memory (NVM) device 630. The terms NVM device 630 and NVM may be used interchangeably herein. The memory controller 620 is depicted in greater detail in FIG. 4, to be further described below. Some of the elements of the memory controller 620 have been omitted from FIG. 4 to reduce crowding in the figure.

The embodiments of the invention overcome major challenges to enable implementing security primitives with persistent memory systems, by using the ultra-low (UL) overhead and recovery time (O&RT) device 650 of FIG. 6A. The UL-O&RT device provides hardware that enables ultra-low recovery time and additionally may ensure recoverability of parallelizable trees (such as in SGX). The UL-O&RT device 650 may, based on a key observation, persistently track the addresses of blocks in a counter, and wherein Merkle Tree (MT) caches can be used to significantly reduce recovery time. However, the addresses in such MT caches do not change as frequently as the content; addresses change when a miss or crash occurs, and hence the overhead to track them in memory is minimal. By tracking such addresses, after a crash the memory system 600A of FIG. 6A, operating with the UL-O&RT device 650, may need to rebuild only the affected parts of the tree. Moreover, for SGX-style trees, the metadata cache is shadowed and the integrity of such shadow version may be elegantly protected. Thus, at recovery time of an SGX-style tree, the memory system 600A needs to restore back only to the shadow version of the cache. Hence, the memory system 600A with a UL-O&RT device 650 addresses recovery time of both general trees (Merkle Trees) and SGX-style trees.

The UL-O&RT device 650 may sometimes be referred to as Anubis (the ancient Egyptian (by keeping an integrity-protected shadow copy of the cache in persistent memory). god) for the ability to watch over the dead (by tracking potentially lost metadata) and embalming The UL-O&RT device 650 may include a shadow tracker memory 660 (see FIG. 6A) as will be described in more detail below. The shadow tracker 660 may include an address tracker module 662 and an address preparer module 666. The UL-O&RT device 650 may include a victim block identifier 670 to identify blocks associated with a miss. The victim block may be in a counter cache or in a Merkel Tree (MT) cache. By way of non-limiting example, a miss occurs when an address is looked up in the cache? but s not found, which may be the result of at least one event that changes or deletes stored data, counter cache data, and/or Merkle Tree cache data. The event may be the result of a malicious attack, unauthorized tempering of data or an internal or external interruption of normal memory operations. The device 650 may also include a cache miss detector 675 to detect a miss associated with a missed address in a cache, such as the counter cache or the MT cache.

The UL-O&RT device 650 may include a WPQ inserter module 677 to insert into the WPQ the data of the victim block. The UL-O&RT device 650 may include a WPQ flush/eviction tracker 679 as will be discussed in more detail in relation to FIGS. 6B and 8A-8C. The UL-O&RT device 650 may include an Anubis for a General Integrity Merkle Tree (AGIT) read module 680 as will be described in more detail in relation to FIG. 8A. The UL-O&RT device 650 may include an AGIT read plus module 685 as will be described in more detail in relation to FIG. 8B. The UL-O&RT device 650 may include an Anubis for an SGX Integrity Tree (ASIT) module 690 as will be described in more detail in relation to FIG. 8C. Each of these modules may include program instructions stored in a computer readable medium which when executed by a processor cause the processor to perform the functions or acts as described herein.

The memory system 600A may include an NVM device 630 having among other things a shadow tracker memory region which includes a persistent cache reserve addresses section 632 for the placement of addresses as described in relation to FIGS. 6B and 8A-8C. The NVM device 630 may include a shadow table 634 as described in more detail in relation to FIGS. 8C and 9B. The NVM device 630 may include a Shadow Counter Table (SCT) 636 and a Shadow Merkle Tree Table (SMT) 638. The SCT 636 may include SCT memory blocks as shown in FIG. 9A. The SMT 636 may include SMT memory blocks. Specifically, the data inserted into the WPQ by the WPQ inserter module 830 is later inserted into a. SMT 636 or a SMT 638.

Figure 8A:
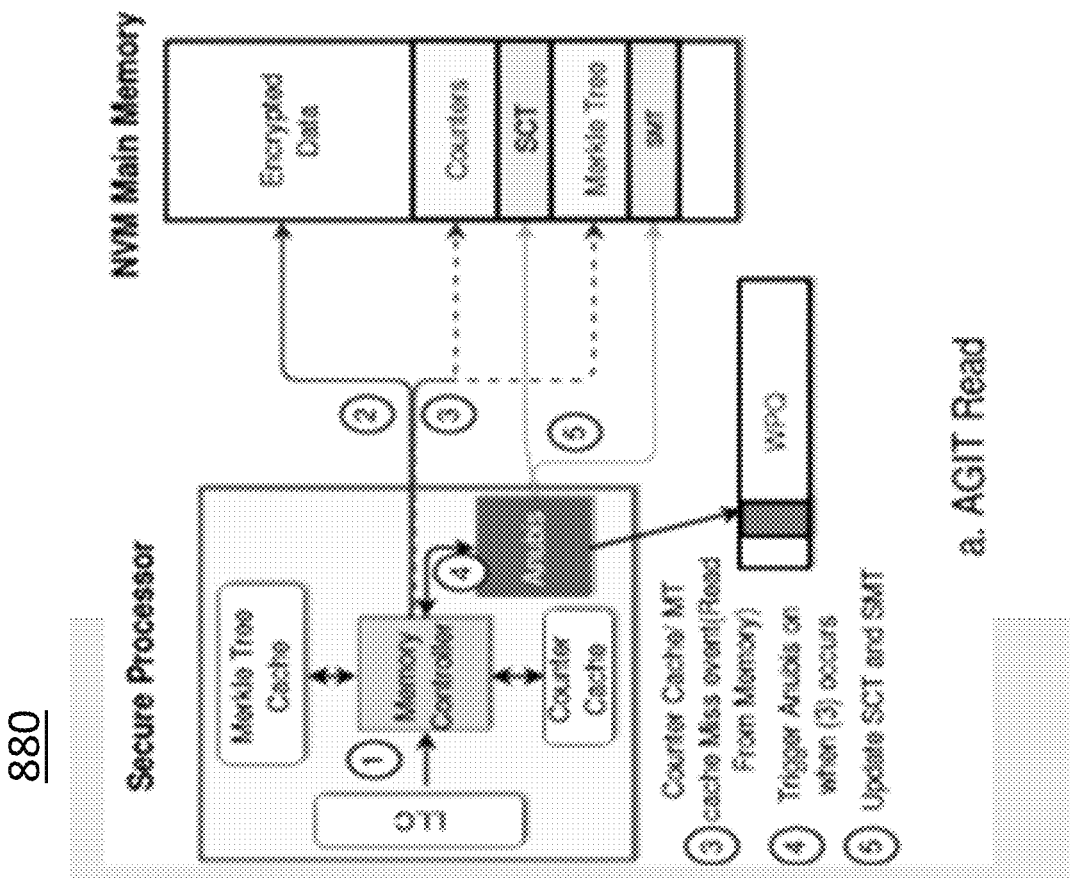
FIG. 8A illustrates a block diagram of an Anubis for General Integrity Tree (AGIT) Read operation.
Figure 8B:
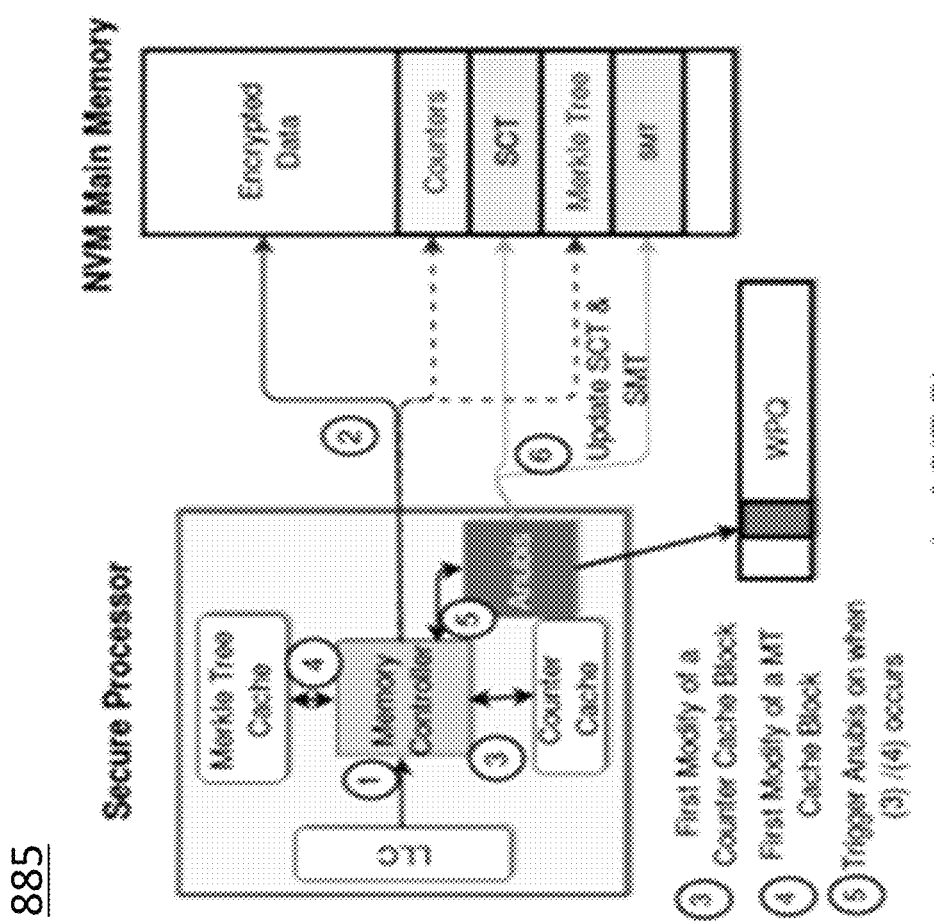
FIG. 8B illustrates a block diagram of an AGIT-Plus operation.
Figure 8C:
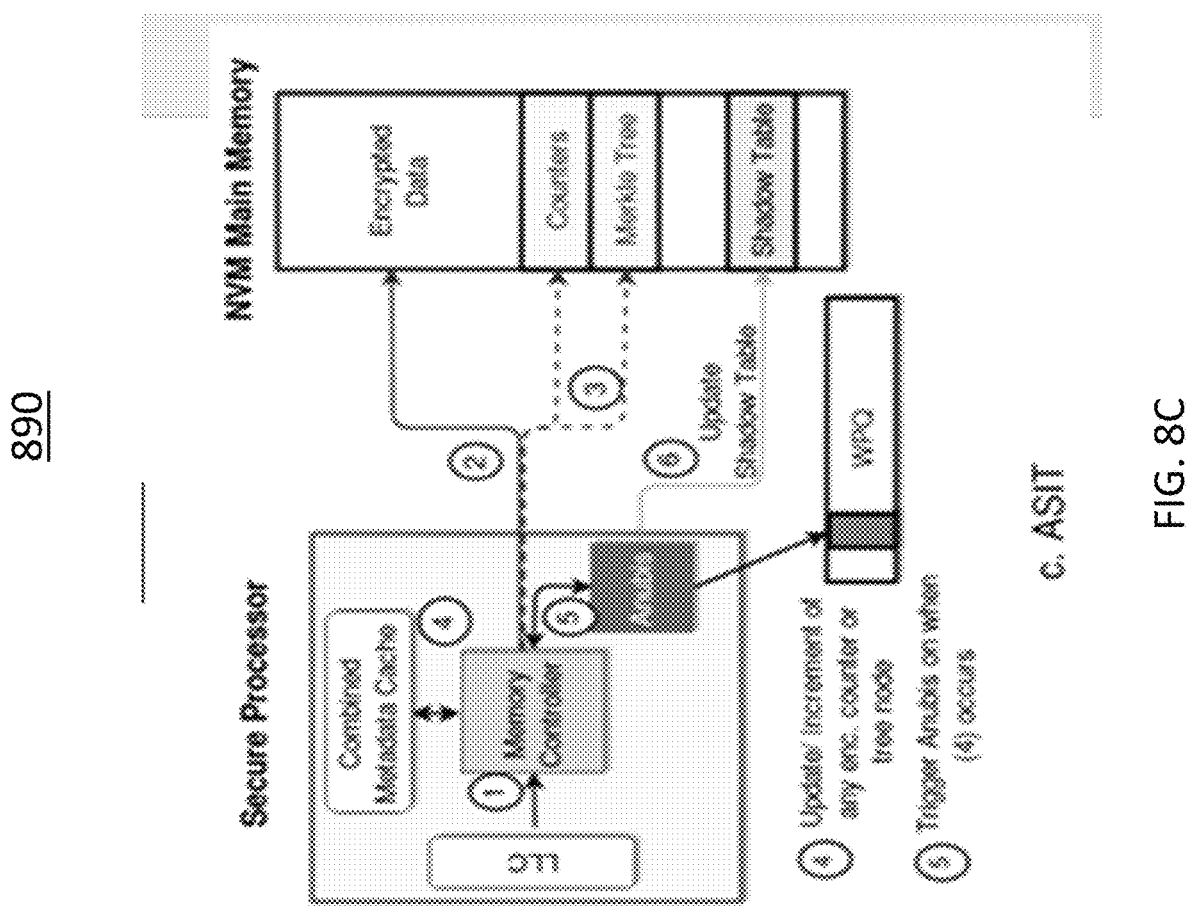
FIG. 8C illustrates a block diagram of an Anubis for SGX Integrity Tree (ASIT) operation.
Figures 9A, 9B:
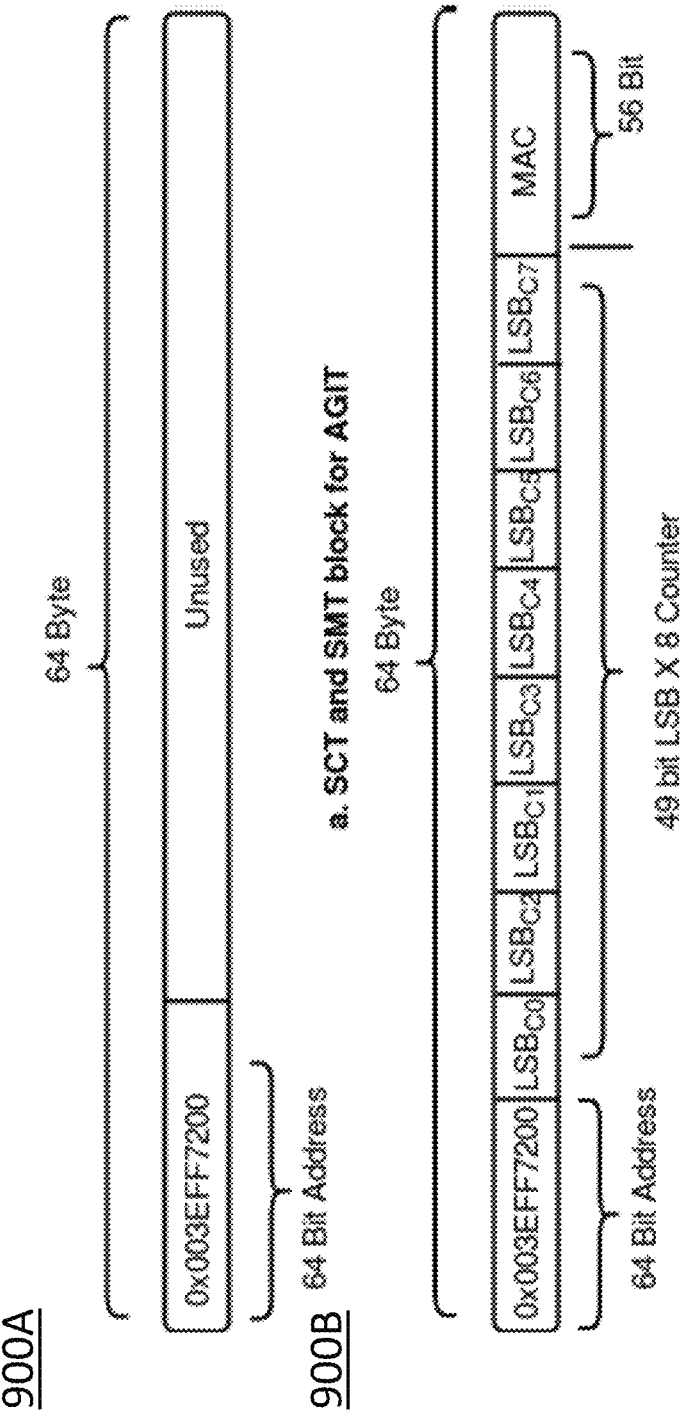
FIG. 9A illustrates an organization of Shadow Counter Table (SCT) and Merkle-tree Table (SMT) memory blocks of a shadow table block in AGIT and ASIT.
FIG. 9B illustrates the organization of the Shadow Table for ASIT scheme.

The NVM device 630 may include a counter cache 640 and a Merkel Tree cache 642 for storing instantiations of the counters of the counter cache and MT data of the Merkel Tree cache in the memory controller of the secure processor (FIGS. 8A-8C).

To evaluate the performance overhead of the embodiments using Anubis, Gem5, a cycle-level simulator that runs memory-intensive benchmarks from SPEC2006 suite (Standard Performance Evaluation Corporation) was used. The evaluation shows that, on average, Anubis reduces the performance overhead from 63% (for strictly-persistent) to approximately 3.4%, which is nearly as low as Osiris overhead (1.4%). Most importantly, Anubis achieves a recovery time of 0.03 s, whereas Osiris requires an average of 7.8 hours for 8 TB of data to recover both the encryption counters and the Merkle Tree. Besides, Anubis's recovery time is a function of the security metadata cache size and does not increase linearly with memory size as in other schemes. The security metadata cache may include a counter cache and Merkle Tree cache. Thus, the size of the secure (security) metadata cache is a function of at least the size of the counter cache and Merkle Tree cache.

Specifically, the embodiments of the UL-O&RT device or its Anubis element include a memory controller design that enables low-overhead and low recovery time for[7] integrity-protected systems configured to recover parallelizable Merkle Trees, such as Intel's SGX counter tree. Anubis may be configured to achieve recovery time speedup (10× speedup) that keeps secure memory size practical when used with persistent memory. The embodiments herein address the impact of Merkle Tree cache update scheme and Merkle Tree implementation (parallelizable vs unparallelizable) on recoverability.

Security and persistence have to be considered during the design of NVM-based memory systems. In fact, persistence of data has to be accompanied by persistence of the related security metadata to ensure secure and functional recovery.

State-of-the-art secure memory systems employ counter-mode encryption where each memory block (cache line) is associated with a specific counter that is used along with a processor key to encrypt/decrypt the data block written/read to/from memory. While ensuring the confidentiality of such counters is considered unnecessary, their integrity must be protected; using an old counter value would compromise the security of counter-mode encryption. To protect the integrity of the counters, a Merkle Tree is generally used. The Merkle Tree, also referred to as a hash tree, comprises a tree of hashes (hash values) in which the leaves are hashes of data blocks, or in this case counter values. Nodes farther up the tree are the hashes of a concatenation of their respective children. The root is the topmost hash value, representing a hash of all the hashes in the tree. The root of the tree (i.e., the hash value at the tree root) is always kept in the processor chip. Each counter update changes the root value, and hence any tampering will be detected due to a root mismatch. Such integrity trees have also been deployed in commercial products for secure processors, e.g., Intel's SGX. Moreover, integrity trees have been considered thus far the most secure scheme with low on-chip storage overhead; wherein in some embodiments the root needs to be kept inside the processor chip.

The primary aspects of secure NVM systems and related concepts are described below to assist in understanding the embodiments of the present invention as related to the ultra-low overhead and recovery time technique for secure NVMs. An overview of memory encryption schemes, crash consistency and atomicity of security meta-data persistence are described as background for understanding the present invention.

Threat Model

Similar to other state-of-the-art approaches, the threat model of the embodiments herein may only trust the processor chip. This model can identify an attacker who scans the memory, snoops the memory bus, replays memory packets, and tampers with memory contents or memory bus packets. Attacks such as access pattern leakage, memory timing, power analysis, speculative execution and electromagnetic (EM) side channel attacks are not addressed herein.

Counter-Mode Encryption

This technique is used in state-of-the-art secure processors. Counter-mode encryption enables overlapping the encryption/decryption latency with fetching data, by using Initialization Vectors (IVs) to generate encryption/decryption pads that are XOR'ed with ciphertext/plaintext to complete the decryption/encryption process. Thus, fetching the data can occur concurrently with generating the pad, typically called a One-Time Pad (OTP), from the IV. Additionally, by ensuring spatial and temporal uniqueness of each OTP, the same data is very unlikely to generate the same ciphertext; part of the IV (counter) will change each time it is used for encryption, and the address of the block is used as a part of the IV to ensure spatial variation.

Since the read/write granularity in a memory system is the cache blocks, typically 64B, it is common to associate each cache block with a counter that will be used to establish the IV to be used for its encryption/decryption. However, counter-mode encryption strictly prohibits reusing the same IV with the same key as it enables known plaintext attacks. Therefore, such counters should be large enough to reduce the overflowing rate in which the whole memory must be re-encrypted with a new key. Therefore, state-of-the-art schemes organize counters into major, small, and minor counters, typically 7 bits, is associated with each cache block (64B), and a larger major counter, typically 64 bits, is shared across all cache blocks of the same page (4 KB). By doing so, when a minor counter overflows, the major counter is incremented, and all the page will be re-encrypted with the new major counter.

Prior art FIG. 1 illustrates Counter-Mode Encryption in state-of-the-art secure memories 100. FIG. 1 depicts how Initialization Vectors (IVs) are established from counter blocks. Note that page counters are packed in 64B counter block that contains 64 minor counters (one for each cache block in the page) and a major counter. However, the SGX scheme uses 56-bit counters and packs 8 counters per cache line.

Split-counter scheme may be used for the general memory encryption scheme and SGX-like 56-bit counters in each cache line for SGX-style scheme.

Integrity Verification

Ensuring integrity of counters is a major security requirement for counter-mode encryption schemes. Typically, a root hash value that is calculated over all the counters is stored in the processor chip. However, to facilitate fast verification of counters and updating the root, a tree of hashes is typically used. By doing so, verifying a counter or updating its hash value requires accessing the corresponding part of the tree instead of all other counters in the system. As described elsewhere herein, such tree of hashes is typically referred to as a Merkle Tree.

State-of-the-art implementations incorporate data integrity verification with counter integrity verification. In particular, ensuring the integrity of the counter through a Merkle Tree while protecting data through a MAC (Message Authentication Code). value calculated over the data and the counter would be sufficient from security standpoint. Such systems that employ Merkle Tree for counters+MAC (over counter and data) are called Bonsai Merkle Trees.

In general, there are two types of Merkle Trees, non-parallelizable and parallelizable (similar to SGX-style) as will be discussed next.

Non-Parallelizable Merkle Tree

Prior art FIG. 2 illustrates a non-parallelizable Merkle Tree scheme 200. Specifically, FIG. 2 depicts a general Merkle Tree scheme that builds on the hashes of hashes. In this scheme, a number of counter blocks are hashed together using a cryptographic hash function stored in the processor. These hashes are hashed over and over again and a tree structure is formed with the 64B counter blocks being the leaves and one 64B hash at the top of the tree as the root, which is always kept inside the processor. As mentioned earlier, the counter blocks are organized using the split-counter scheme; the Bonsai Merkle Tree style may be used.

In this scheme, each level of the tree consists of hash values calculated over a number of its direct children nodes (those on the lower level). For instance, in each level, each node is 64B that consists of eight 8B hash values. Each 8B hash value has been calculated over a 64B node of the lower level, thus the tree is called 8-ary tree (each 8 nodes will have one parent node in the upper level). Lower level nodes are verified using the upper level nodes present in the cache. In the worst case, when all the corresponding nodes in the upper levels are missing, there is a need to verify that each level matches the MAC calculated in its upper level up to the root. However, such verification steps can occur in parallel for each level. In contrast, updating counters would need updating upper levels sequentially; it is not feasible to compute the hash value of next level before the current level. Thus, parallelizing updates to the Merkle Tree levels is not achievable in this scheme.

One thing that is important to note here is that the whole Merkle Tree, including the root, can be reconstructed by the processor from the leaves (counter blocks). Thus, while the reconstructing time can be too long, persisting just counter blocks is sufficient to reconstruct the tree starting from the leaves all the way up to the root.

Parallelizable Merkle Tree

Figure 3:
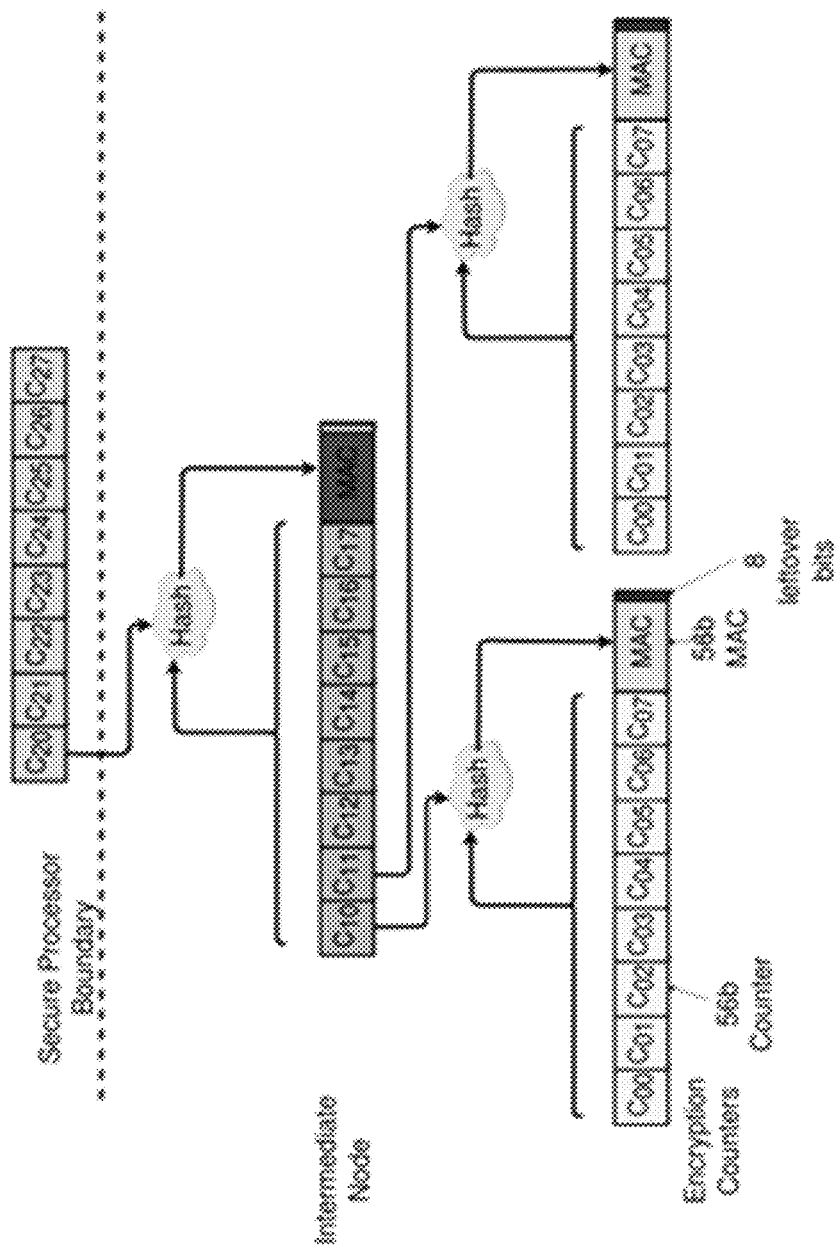
FIG. 3 illustrates an SGX style parallelizable Markel Tree.

Prior art FIG. 3 illustrates an SGX-style parallelizable Markel Tree 300. To enable parallelism, parallelizable Merkle Tree uses nonces for each tree node. A MAC is stored in each block with counters/nonces. The MAC is calculated over the nonces in the block and one nonce from the parent block using a secret hash function stored in the processor, as shown in FIG. 3. Whenever an encryption counter is incremented, the respective nonces in the parent nodes are incremented too. In this way, parallel updates of MAC values are possible since each block can be updated separately by incrementing their nonces and calculating the MAC over the new nonces.

There are two design options for the update of such a tree structure. Once an encryption counter is updated, it is sufficient to update the upper nodes up to the first cache hit (i.e., the first node in the cache). This scheme does not immediately update the root. Once that node in the cache (one which is the most updated one in the cache and beyond which writes did not propagate last time) gets evicted, the parent node is incremented. Thus, writes are propagated upward lazily relying on the assumption that such updates will eventually be propagated once evicted from cache. The other design option is to always propagate the tree update up to the root regardless of the availability of intermediate nodes in the cache. The tree structure design of the embodiments herein, may adopt or be compatible with the former known methods.

Although such a parallelizable tree structure allows parallel authentication as well as update of tree, the recovery of the tree structure after a crash is challenging since the nonces are lost along with the hash stored in the same block. Unlike the general hash tree structure, it is impossible to regenerate the tree from the encryption counters and hence impossible to verify a counters' integrity if intermediate nodes are lost.

Recovery of Encryption Counters

Recently, a scheme has been proposed to recover encryption counters after a crash. The authors of a paper describing this scheme discussed several recovery techniques, including extending the data bus to include a portion of the counter, phase, which stores the low significant bits of the counter to relax the need to persist the counter block on each update. Furthermore, the authors propose a novel scheme, called Osiris, which leverages the encrypted ECC bits co-located with data as a sanity-check to help retrieve the counter used for completing the encryption of data. By combining this with a stop-loss mechanism, persisting the counter every Nth update, a few trials are needed to recover each counter through checking ECC bits sanity.

The embodiments of the present invention focus on speeding up recovery of the Merkle Tree. Thus, restoring encryption counters is necessary but orthogonal to any counter recovery mechanism. While, some embodiments of the Osiris scheme may be used to recover leaves (in case of general MTs), any other counter recovery schemes, e.g., extending the data bus or writing phase bits along with data by adding extra bursts, can work with the Anubis scheme of the present invention, wherein the Anubis scheme is configured to speed up recovery time by reducing the number of counters that need to be recovered, instead of focusing on how they are recovered. Moreover, the present invention enables recovery in schemes where recovering just the counters is insufficient (e.g., SGX-style trees) to rebuild the tree.

Merkle Tree Reconstruction

Once all of the counters are corrected using the Osiris technique or another schemes, the Merkle Tree can be regenerated, and the integrity of the counters can be verified by matching the currently calculated root with the root of the tree stored securely inside the processor. However, rebuilding the Merkle Tree is required to verify the first access; verifying each level would require ensuring that all its children are up-to-date, and hence a recursive operation of calculating MACs over all the tree will be needed after recovery. Such a recursive process would lead to reconstructing the Merkle Tree. Unfortunately, since NVMs are expected to have huge capacities, such trees will be huge and would take hours to reconstruct.

Relationship Between Recoverability and Tree Update Scheme

As discussed earlier, Merkle Tree caches can be eagerly updated all the way up to the root on each write access or updated lazily. In the eager update scheme, the root always reflects the most-recent state of the tree, and thus can be used for verification after recovering the system following a crash. In contrast, in a lazy update scheme, the Merkle Tree nodes and the root might be stale. Considering persistent memory systems, the lazy update scheme can be used if there is a way to completely recover the cache content and verify their integrity (and freshness) using means different than relying on the root; the root is stale and can be no longer used as a way to verify the most-recent content. However, for an eager update scheme, the root can be used to verify the integrity of all contents, including the recovered tree updates.

SGX-style trees are difficult to recover by only knowing the root value due to the complex interrelationships of the MT levels; the updated intermediate nodes/levels must be also recovered and used for verification of upper and lower levels due to inter-level dependency. Thus, for SGX-style trees, the most suitable scheme to ensure recovery would be a secure and verifiable recovery of the Merkle tree cache, while using a lazy update scheme. In contrast, for the Bonsai Merkle Tree, one may rely on either lazy or eager update schemes, however, an eager update scheme would incur much less run-time overhead since it does not require frequent memory updates to enable verification and restoration of the exact state of the Merkle Tree cache and counter cache; just recalling which addresses could have been potentially lost, and fixing them, is sufficient.

In summary, if during a crash, the root does not reflect the most-recent value, (the root is not strictly updated) a mechanism may be needed to securely recover and verify the updates in the Merkle Tree and the counter caches, i.e., guaranteeing that the values of all cache memory updates are known and their freshness verified. However, if the root is strictly updated, i.e., using an eager update scheme, then one can recover the tree and counters, and verify them using the root. The exception is for SGX-style trees, as the eager scheme is insufficient due to the reliance of inter-level verification (See FIG. 3).

Atomicity of Data and Security Metadata Updates

In modern processor systems, there is a feature called ADR that allows enough power (a standby power source or super capacitors) to flush the contents of the Write Pending Queue (WPQ) inside the processor to the NVM memory when a crash occurs. WPQ flushing is initiated when the main power is cut off. However, the WPQ may have approximately 16-32 entries. Since anything inserted into the WPQ is guaranteed to persist, i.e., in the persistent domain, one should ensure that the content of the WPQ ensures consistency or at least there is a way to bring the system to a consistent state after power restoration. This presents a challenge to atomically insert updates to data, counters, Merkle Tree nodes and Anubis updates in the WPQ. To solve this problem, internal persistent registers are relied upon to hold all the updates (data, counter, Merkle Tree nodes and Anubis updates) before attempting to insert them individually into the WPQ. Note that once the data arrives at the memory controller, it is placed in a volatile write buffer (outside the persistent domain) and the entry is considered persisted after its accompanying updates (counter and Merkle Tree nodes) and its data are placed in the persistent registers. Later, the contents of the persistent registers are individually inserted in the WPQ. The persistent registers can be written fast, but are limited to only a few entries. The WPQ is slightly larger and supported additional power sources. All persistent writes need to be written to the WPQ, but persistent registers are dedicated to only security metadata, and thus only one batch of updated metadata is committed at any given time.

If a crash occurs while copying the content from the persistent registers to the WPQ, the memory controller will try again to insert these updates to the WPQ after recovery. Note that if a crash occurs while still trying to make the updates to the persistent registers, then the write is already lost as it has never reached the persistent domain. DONE_BIT (a value that indicates whether a batch update has been committed) may be used to determine whether the crash occurred while there is valid content in the persistent registers. The DONE_BIT value may, in some embodiments, be set only after all affected values have been written to persistent registers and the value cleared after all persistent registers have been copied to WPQ. Note that the scheme is similar in spirit to REDO logging, however using internal persistent registers. Use of internal persistent registers has been described in state-of-the-art systems.

Figure 4:
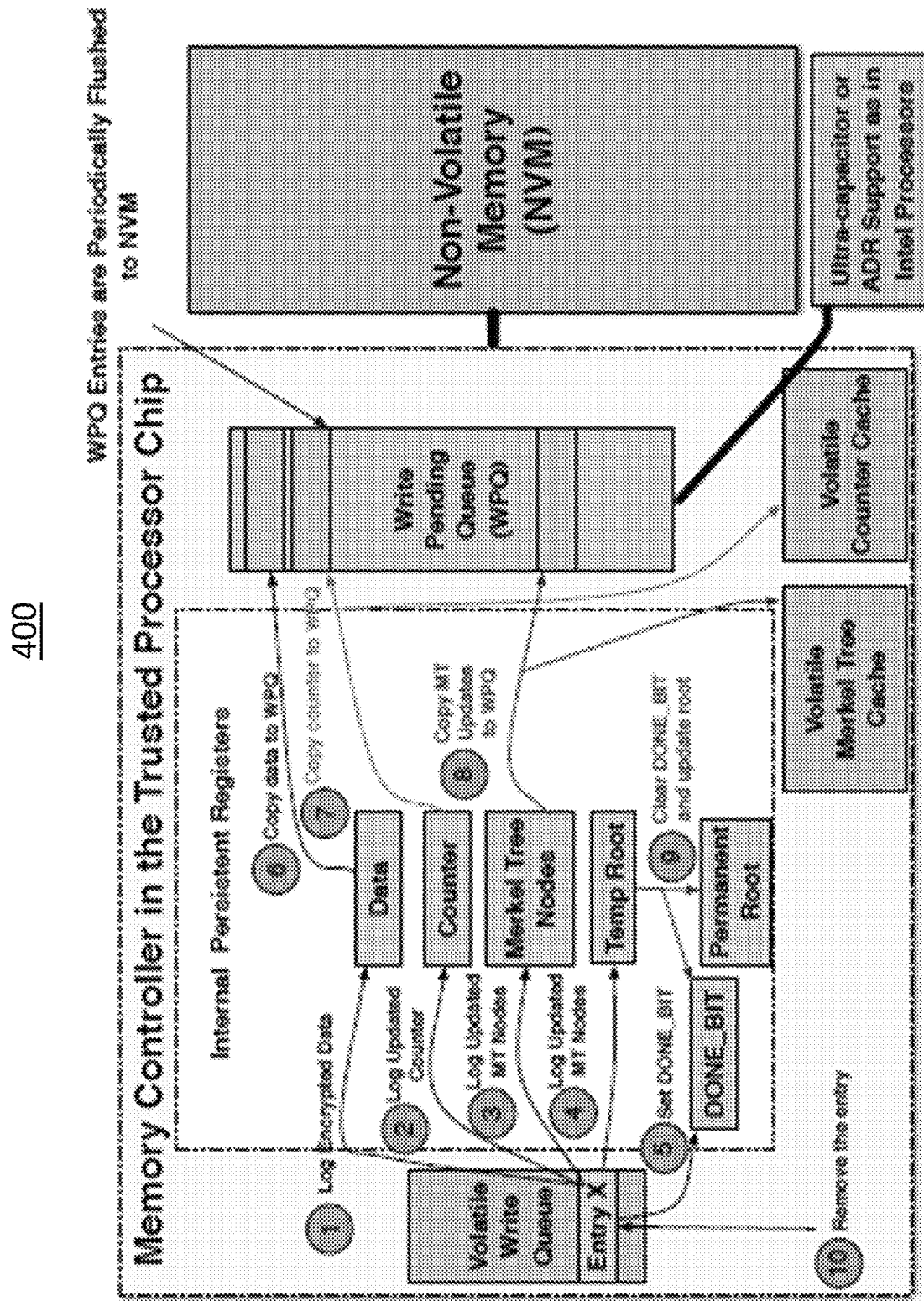
FIG. 4 illustrates a block diagram an atomic persistence of integrity-protected non-volatile memories (NVMs) and memory controller on a trusted processor chip.

Prior art FIG. 4 illustrates an atomic persistence of integrity-protected non-volatile memories (NVMs) and a memory controller on a trusted processor chip 400. Specifically, FIG. 4 depicts the design of atomic updates of the Merkle Tree in a strict persistence scheme.

In some prior art embodiments, a two-stage commit process may be used that leverages persistent registers to implement the discussed REDO logging scheme. However, to avoid slow writes and limited endurance of NVM registers, such persistent registers are implemented as volatile registers that are backed by (copied once a crash is detected) NVM registers, or simply dedicating a few entries from the WPQ as volatile registers and leveraging the ADR to copy them to internal NVM registers. Note that multiple write entries in WPQ can be flushed concurrently to exploit the bank-level parallelism in NVM and avoid serializing writes to NVM.

Motivation for the Present Invention

The quantitative results that demonstrate the state-of-art problems associated with meta data recovery will not be described. As discussed earlier, parallelizable Merkle Trees, as in SGX-style trees, are very challenging to recover. Unlike a typical Merkle Tree, for an SGX-style tree the verification of each level counters also relies on the cryptographic hash values stored in their children nodes; the hash value in their children levels are calculated over the counters in that child node and a counter in the upper level, i.e., each upper level counter is used as version number that will be verified by the children hash value and later verified by the hash value of its neighboring counters along with its parent counter. The process continues until all corresponding parent counters are verified, however, if such parent counters exist in the cache, it means they are already verified and thus it is sufficient to stop once the lowest level hit in cache is found. Unfortunately, if any of such intermediate nodes get lost during a crash, even if the root counters are saved inside the processor, it is impossible to verify the integrity of the leaves (counters); they strictly rely on verifying all their parent counters. Thus, due to this inter-level dependence in this style of Merkle Tree, it needs special handling to enable recovery.

Meanwhile, general Merkle Tree implementations, such as a Bonsai Merkle Tree, can be completely reconstructed if the system can recover encryption counters (the leaves); upper levels of Merkle Tree are simply the hash values of lower-levels, and thus as long as the root hash value matches after reconstruction, the counters are considered verified. However, even for a general Merkle Tree, the recovery time is impractical for practical NVM capacities, e.g., 4 TB or 8 TB.

Figure 5:
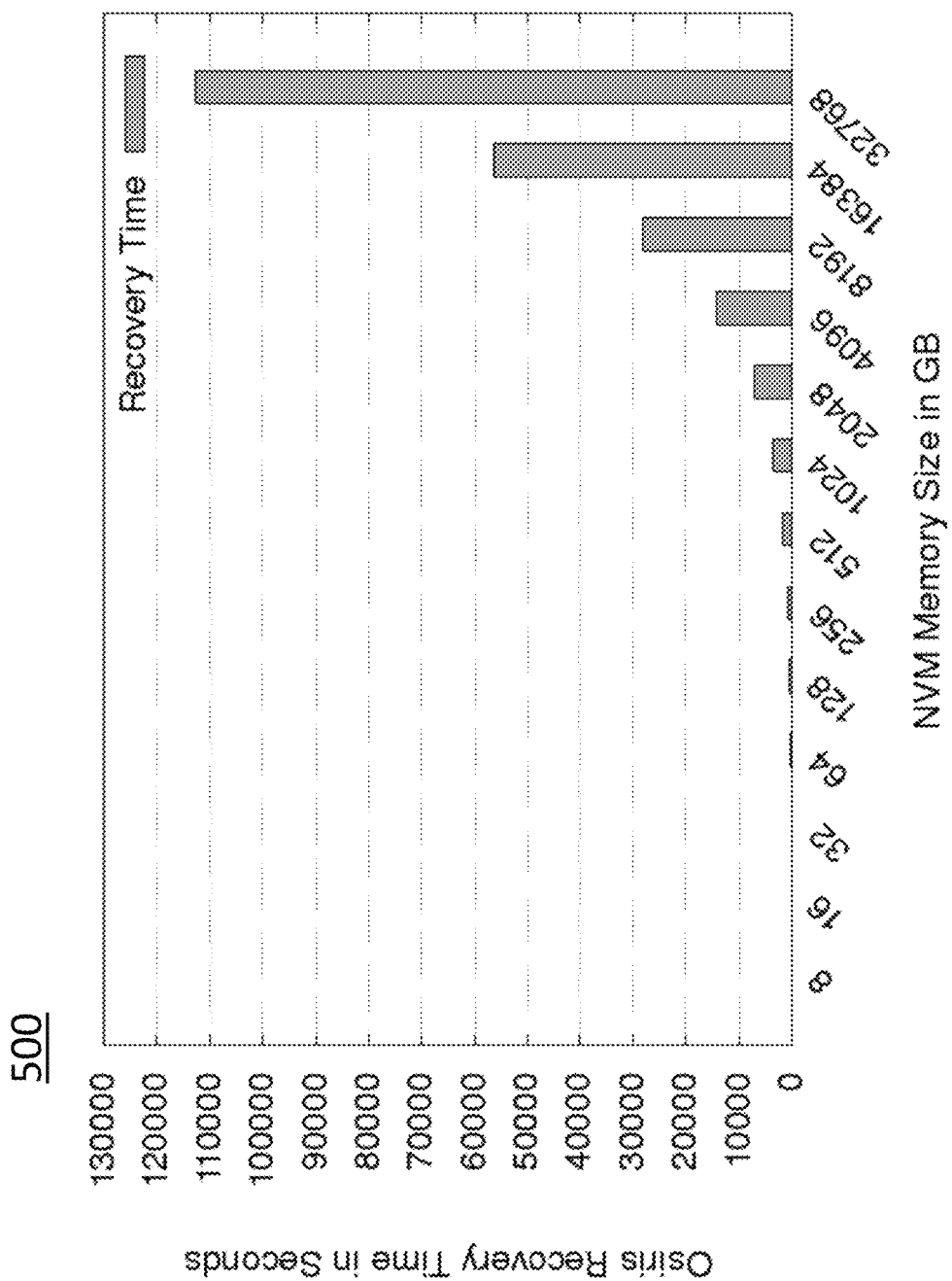
FIG. 5 illustrates a graphical representation of recovery time of different memory sizes.

FIG. 5 illustrates a graphical representation 500 of the recovery time for different NVM capacities assuming encryption counters can be recovered using state-of-the-art counter recovery schemes.

Counter recovery schemes rely on reading data blocks and use their accompanied ECC bits as a sanity-check for recovering the encryption counter value. Thus, the recovery time scales linearly with the size of the memory (number of data blocks). For instance, an 8 TB NVM capacity, almost 8 hours are needed to recover the system. With the expected huge capacities of NVMs, any operation that is governed by a functional relationship $O(n)$, wherein n is the number of data blocks (typically 64B) in memory, can take impractical time and should be avoided.

Based on these two key observations, two main design principles have been employed in the present invention, as described below.

Enable $O(n\_cache \times \log_{TreeArity}(n))$ recovery time, where n_cache is the number of blocks in the counter cache, instead, of $O(n)$. For example, $O(1000 \times \log_8(n))$ instead of $O(n)$. This ensures minimal run-time overhead. Thus for an 8 TB memory, instead of iterating over $\sim 13 \times 10^{10}$ blocks, iteration occurs over only $\sim 1000 \times 12$ blocks, which represents a speed-up in recovery time of more than $10^7$.

For the SGX-Style Merkle Tree, it is insufficient to recover encryption counters even when the most recent root value is available. There must be a mechanism to reliably recover and verify the integrity of all the lost intermediate nodes.

Without such two major design principles, the recovery of integrity-protected NVM memory systems would be either impractical (due to significant recovery time) and/or completely unfeasible due to lost intermediate nodes in an SGX-style inter-level dependent tree. Thus, the UL-O&RT device of the present invention includes a memory controller design, referred to as Anubis, that realizes both design principles.

Anubis Design

The embodiments of the UL-O&RT device for ultra-low overhead and recovery time for secure NVMs will now be described; the design options and details for Anubis are also described.

Tracking Updated Security Metadata

One key observation is that it is sufficient to persistently track the addresses of the blocks in the Merkle Tree and counter caches to significantly reduce recovery time; wherein in this embodiment only the blocks of the tracked addresses that have possibly been updated without being persisted. Thus, by having the ability to identify the addresses of the counter blocks that were at the cache at the time of crash, the system 600A (see FIG. 6A) may iterate through their corresponding counter blocks. This targeted recovery progresses by trial and error. Once completed, the root of the tree is recalculated and matched against the root stored in the processor to serve as a verification.

Similarly, by tracking the addresses of the Merkle Tree nodes in the Merkle Tree cache, after fixing lost counters (using known prior art techniques) reconstructing a general Merkle Tree can be implemented by starting from leaves, fixing those identified as lost, then moving to the upper level and fixing those identified as lost, continuously until reaching the top level. The order of fixing the tree entries is important; upper level repairs rely on first repairing the lower levels of the tree.

Figure 6B:
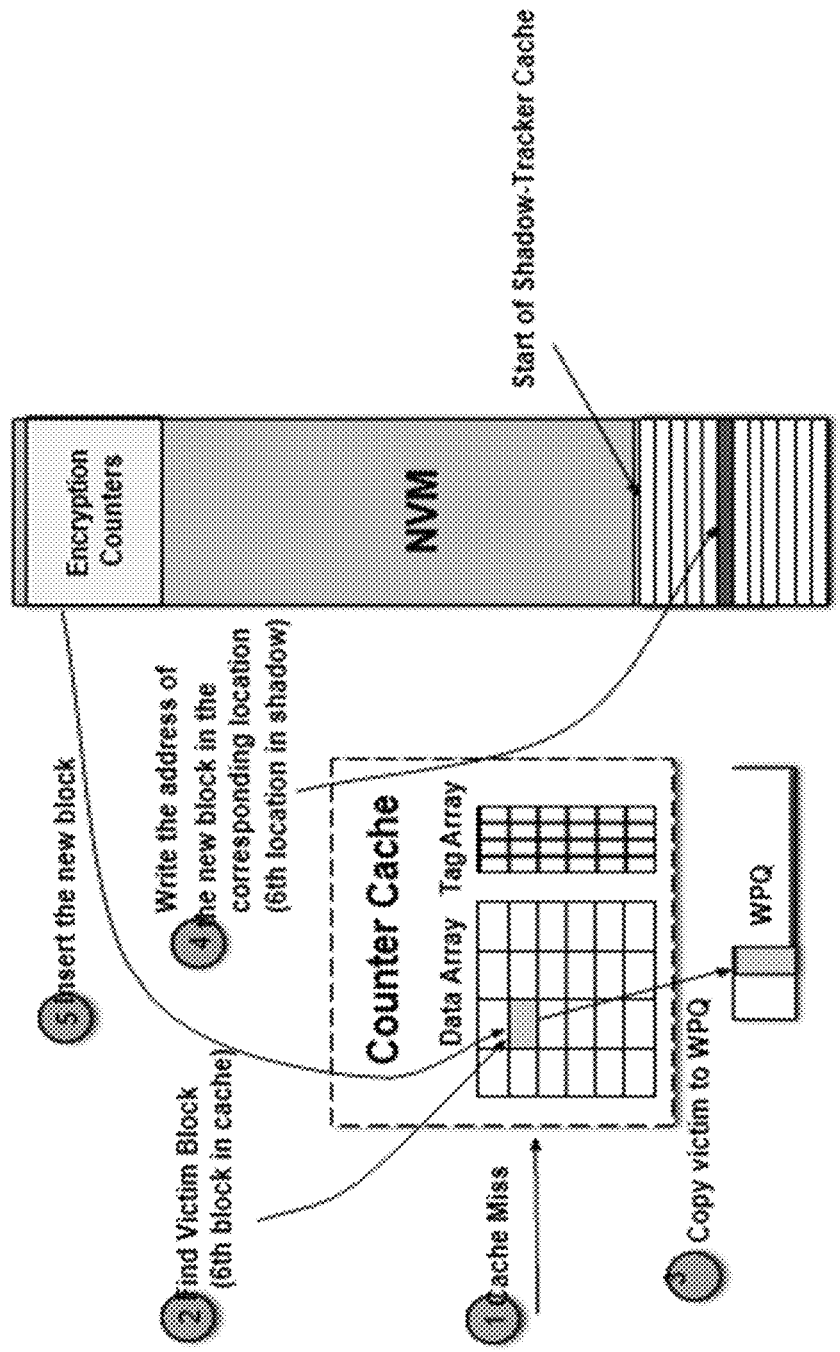
FIG. 6B illustrates a block diagram shadow-tracker during a counter miss.

FIG. 6B illustrates a block diagram and flow diagram of a shadow-tracker 660 during a counter miss. In its simplest form, shadow-tracking can be implemented by reserving the cache size in NVM, e.g., a 128 KB will be reserved in NVM for shadowing the addresses in the 128 KB counter cache. A victim block identifier 670 identifies the victim block associated with a counter cache miss (FIG. 6B) or Merkel Tree cache miss. During a counter cache miss, based on the location of the victim block in the data array of the counter cache, the address of the new block is written to the NVM by the address tracker module 662 where the offset address corresponds to the location in the cache. (The shadow tracker region in the NVM has a starting or base address and the offset address in the shadow tracker region is calculated relative to the location of the victim block in the counter cache.) The address tracker module 662 performs a similar approach for shadow-tracking a Merkle Tree. Thus, when a miss occurs, and we need to place something in the cache, we need to log its address in the shadow tracker. Where should we place it in the shadow tracker depends on where we are inserting it in the memory. The structure of shadow tracker and cache are like mirrors of each other.

Note that the position of the block in the counter cache remains fixed for its lifetime in the cache; LRU bits (least recent used bits) are typically stored and changed in the tag array. Since the miss rate of counter cache is typically very small, the additional writes will be minimal.

As mentioned herein, updated nodes in both the Merkle Tree and the counter caches, must be tracked. For terminology, the counter shadow-tracker may sometimes be referred to as a Shadow Counter Table (SCT) 636, and the Merkle Tree shadow-tracker may be called a Shadow Merkle-tree Table (SMT) 638. In both cases, the storage overhead is minimal, e.g., for a 128 KB (kilobyte) counter cache size and 8 TB (terabyte) memory, the overhead may be only the counter cache size/memory size such as 128 KB/8 TB.

FIG. 9A shows how SCT 636 and SMT 638 memory blocks are organized 900A.

The Anubis system of the present invention comprises two different schemes, one suitable for a general Merkle Tree structure (e.g. a Bonsai Merkle Tree) and another suitable for an SGX-style tree. The first scheme may be referred to as AGIT (Anubis for General Integrity Tree) and the second scheme as ASIT (Anubis for SGX Integrity Tree).

Anubis for General Integrity Tree (AGIT)

AGIT Read: Tracking Metadata Reads:

As discussed earlier, when an eager cache update scheme is used, a general Merkle Tree can be recovered by restoring the leaves and updating the tree upwardly before finally verifying that the resulting root matches the root value inside the processor. Thus, the system may directly apply the idea of shadow-tracking for both a Merkle Tree and a counter cache to speed up the recovery process; where only lost nodes and counters may need to be fixed.

For both caches, the shadow regions are updated on each cache miss, i.e., before reading a metadata block from memory, and hence this is referred to as an AGIT Read scheme. Note that such shadow regions are merely used for recovery acceleration; once recovered, as usual, the root will be used to verify all counters and Merkle Tree nodes as they are being read into the processor. Thus, any tampering with the content of shadow regions or unaffected counters (that is, those not in the cache) will lead to root mismatch when the affected (not recovered correctly or tampered with) content is read into the processor.

Referring now to FIGS. 8A-8C, FIG. 8A illustrates a block diagram of an Anubis system for a General Integrity Tree (AGIT) Read operation 880; FIG. 8B illustrates a block diagram of an AGIT-Plus operation 885; and FIG. 8C illustrates a block diagram of an Anubis for SGX Integrity Tree (ASIT) operation 890.

In FIG. 8A, once a memory request from a last level cache (LLC) arrives at the memory controller (Step 1), the required encryption counter and Merkle Tree nodes are retrieved from memory (as shown in Steps 2 and 3), if that data is not already present in the respective cache. Before inserting any of the counter or Merkle Tree blocks in the cache, Anubis prepares, by the address preparer 666 (see FIG. 6A), the address blocks (used for tracking by the address tracker 662) of the counter and Merkle Tree blocks and inserts them, using the WPQ inserter 677, into the WPQ, before inserting them in the cache (as shown in Step 4 Note that since the tracking blocks (prepared in Step 4) are already in the WPQ (persistent write queue), they are considered persistent, however, they will be eventually written to the SCT/SMT region (shadow regions) in memory as soon as WPQ is flushed or such entries are evicted from the WPQ, as tracked or determined by the WPQ flush/eviction tracker 679. Anubis prepares the address block to conform to the block structure as shown and described in relation to FIG. 9A and/or FIG. 9B.

Although the AGIT-Read scheme performs reasonably well with applications that are not read intensive, read intensive applications may trigger extra writes and update the SCT 636 and SMT 638 very frequently.

AGIT Plus: Tracking Metadata Modifications

In the AGIT-Read technique described above, the SCT 636 and SMT 638 are updated whenever metadata are brought into the cache, disregarding the fact that some metadata would never be modified in the cache. In fact, a significant number of blocks leave the cache without any modification.

Figure 7:
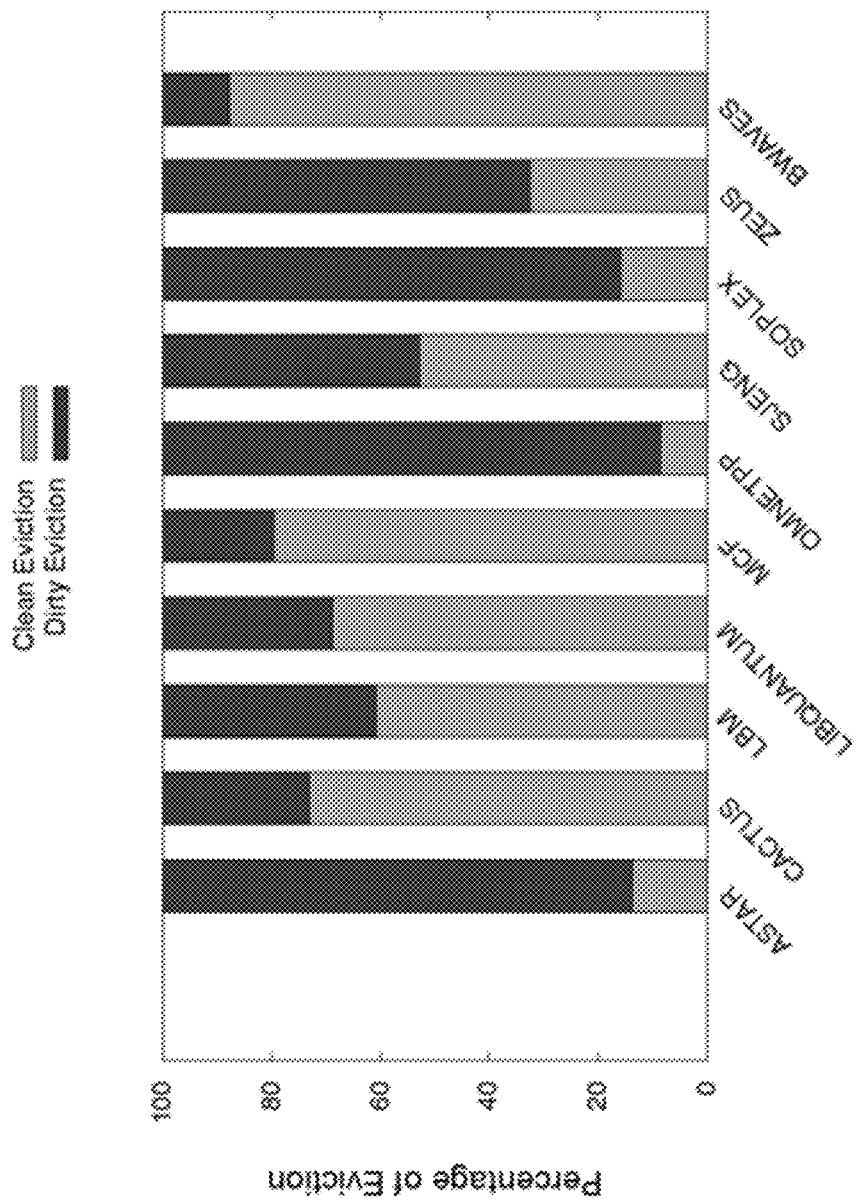
FIG. 7 illustrates a graphical representation of a small number of cache blocks which get modified in cache.

FIG. 7 illustrates a graphical representation 700 of a small number of cache blocks which are modified in cache. As illustrated in FIG. 7, most applications evict a large number of cache-blocks from the counter cache that are clean, i.e., not modified in the cache. Hence, in some embodiments, tracking addresses of only modified blocks provides the same recoverability, but with reduced overhead. Moreover, most dirty cache-blocks are updated multiple times in the counter cache and Merkle Tree cache. In fact, Merkle Tree cache blocks reside in the cache and are modified more than the counter cache blocks. In some embodiments, only tracking once during a dirty cache-block's lifetime is sufficient to successfully recover the system.

Based on these observations, the AGIT Plus embodiment reduces extra updates to the shadow tables 634 by acting whenever a metadata is first modified in the counter cache or Merkle Tree cache. This reduces the overhead of AGIT reads significantly without hurting recoverability. The AGIT-Plus technique (as shown in FIG. 8B) is similar to AGIT-Read except that it may trigger Anubis only at the first update to a counter block or a Merkle Tree block in cache (as in Steps 3 and 4), i.e., setting the dirty bit for the first time, in some embodiments. Before completing the update to the caches, the generated shadow blocks must be inserted in the WPQ.

AGIT Recovery Process

FIG. 10A illustrates a sequence of instructions of a process 1000A for AGIT recovery. The recovery process 1000A of AGIT is straightforward. Once the system is booted up upon recovery, the system starts scanning the content of SCT 636 to acquire the list of possibly lost updates in the cache. For each address, the data blocks (correspond to the possibly lost counters) are read and used to recover the counter using Osiris, as discussed earlier. Note that any other counter recovery scheme would likely have to read the data block, e.g., using phases or an extended data bus. Later, once the affected counters are fixed, AGIT scans through SMT 638 to search for possibly lost updates in the first level (immediate parents of counters) and recalculate the nodes values based on their immediate children (counters). Later, once the first level is fixed, AGIS scans SMT 638 for possibly lost updates to the second level and fixes them by calculating their values based on their immediate children (level 1). AGIT proceeds with the same process by going up in the tree, level-by-level and eventually reaches the root of the tree. Once at the root level, the resulting root from the calculated tree will be compared against the value stored in the processor to determine whether the recovery has been successful. If the resulting root does not match the value in the processor, then the recovery process has failed, and the system issues a warning. Note that the speed-up in recovery mainly stems from the fact that the system may, in some embodiments, (only) need to fix the lost counters and Merkle Tree nodes, rather than naively iterating through all the blocks, as in systems without Anubis system.

Anubis for Use with an SGX Integrity Tree (ASIT)

Unlike general trees, SGX-style integrity-trees advocate for fast updates through limiting dependence between tree levels to (only) a counter on the upper level, in some embodiments. Thus, on each update, affected nodes on different levels can be updated by calculating the MAC over their counters and the updated counter at the upper level. However, this comes at the expense of extra complexity during reconstruction after a crash. Each intermediate node depends on a counter on the upper level, and counters of each level are verified using the MAC value co-located with each node. Thus, by losing the MAC values on different levels, it becomes infeasible to verify the integrity of the tree. Meanwhile, reproducing the MAC values of the intermediate tree is not safe until the counters of the level are verified.

In an SGX integrity tree, 8 of the 56-bit encryption counters are stored along with a 56-bit hash in one single cache line. Each parent node (Merkle Tree Node) also contains 8 counters (56 bit each), and a 56-bit hash value. However, as mentioned earlier, it is very challenging to recover the tree to its previous state after a crash and most of the time quite impossible if some intermediate nodes in the tree are missing. ASIT aims to provide a bookkeeping mechanism that tracks the tree during run-time and therefore recovers after a crash very quickly. Since the encryption blocks in SGX have a structure similar to intermediate levels, a single metadata cache is typically used in the prior art. For the shadow table 634, the SCT 636 and SMT 638 are merged into one larger Shadow Table (ST) 634 with a size similar to the metadata cache. FIG. 9B shows the organization of the Shadow Table for ASIT scheme 900B.

ASIT Metadata Tracking

ASIT's main idea is inspired by Anubis's embalming capability. In particular, ASIT aims to have an exact persistent copy the metadata cache content before a crash. However, such a shadow copy must have its integrity protected against any possible tampering. By doing so, it is sufficient to just restore the metadata cache by copying back the shadow cache after verifying its integrity.

With respect to FIG. 8C, in the ASIT scheme, on each update to encryption counters (due to write requests) in the cache, the Shadow Table (ST) 634 is updated with the modified cache lines in the cache. As described earlier, an eager update scheme is inappropriate for SGX-style trees; having a root value that reflects the most recent tree is insufficient to recover the tree. Meanwhile, strictly tracking all changes to the counters and Merkle Tree would incur significant overhead with an eager update scheme; each write would incur 12 writes to the shadow region. Therefore, opting for using a lazy update scheme while strictly tracking changes to metadata cache; in a lazy scheme only one block is typically updated on each memory write, and thus it is more practical to track such updates, compared to an eager update scheme. However, the cost is the need to fully protect the integrity of the shadow-table through a small general Merkle Tree (3-4 levels) with its root being persistent and never leaving the processor. The updates to the MT protecting the shadow table 634 uses an eager cache update scheme, i.e., the root of the shadow table tree reflects the most recent state of the shadow table 634.

Each Shadow Table block 900B contains the following elements (FIG. 9B): Address: 64 bit Address of the Merkle tree block/encryption counter block modified in the combined metadata cache. MAC: 56-bit MAC value calculated over the updated counter values (Nonces in that node). Counter LSBs: This part consumes most of the space in each SCT entry and contains part of the LSBs of counters in that Merkle Tree node. 8 LSBs from each counter of the MT node are packed together into 49 bytes (49 bits each).

Whenever a 49-bit LSBs of a counter overflows, the MT node is persisted so that the LSB value stored inside SMT 638 can successfully recover the counter value. This ensures that the tree counters are recoverable using the MSB of the memory version of the counters, and the LSBs in the shadow block. Since a 49-bit LSB overflows very rarely, the overhead of persistence due to overflows is negligible.

Protecting the Shadow Table

As mentioned earlier, since, the original root can be stale and hence no longer can be used for verifying integrity, a small non-parallelizable Merkle tree structure is maintained just to provide integrity protection of the Shadow Table (ST) 634. For 256 kB Cache size, a tree of four levels (8-ary) can be maintained. However, there is no need for persisting this tree in the memory. It is sufficient to securely keep the root of such a tree, called (SHADOW_TREE_ROOT), as verification is accomplished during recovery and is very fast. It should be noted that, in the AGIT scheme, such a secondary tree to protect the shadow table 634 is not necessary; if an attacker omits or tampers with entries in shadow caches then the resulting corruption in counters or the Merkle Tree will be eventually detected due to a root mismatch.

ASIT Recovery Process

FIG. 10B illustrates a sequence of instructions of a process 1000B for ASIT recovery. The recovery process 100B in the ASIT scheme is different than the AGIT scheme in following two ways. First, Osiris (or any counter recovery scheme) is no longer needed and hence there is no need to try different counter values to finish the recovery; the LSBs and MAC are replaced directly from the SMT block. Second, instead of rebuilding the Merkle Tree, ASIT recovers the metadata cache to its pre-crash state.

The following steps are required for the recovery in the ASIT scheme.

First, Anubis reads the Shadow Table (ST) 634 from the memory into the cache, and regenerates SHADOW_TREE_ROOT, the root of the general tree that is responsible for the integrity of the Shadow Table 634.

Next, this root is compared with the securely stored version of it in the on-chip NVM register.

Later, once the ST's integrity has been verified, recovery starts by iterating over each Shadow Table block 900B that has been loaded in the cache. For each Shadow Table block 900B, their non-persisted memory counterpart (stale node) is also read and the LSBs and MAC values of that non-persisted node is replaced with the LSBs and MAC stored in the Shadow Table 634, i.e., MSBs of counters are used from the stale node. Later, for each recovered node, verifying that MSBs were not tampered with by verifying the MAC value with the result of applying hash over the counters of the node and the counter in the upper node (from cache, if was recovered).

Once the recovery is finished, every recovered Tree node will have the dirty bit set to 1. In this way, the updates lazily propagate to the memory due to natural eviction.

Evaluation Methodology

To evaluate the performance overhead of the Anubis system, Gem5, a cycle-level simulator, was used. As illustrated in the Table I, a 4-core X86 processor was simulated. Also, 16 GB PCM-based Main Memory was used with parameters used in the prior art. Analyses of different sizes of the counter cache and Merkle Tree cache were evaluated as described below. Eleven memory-intensive applications were used from the SPEC 2006 benchmark suit to stress the model. For each application, the system was fast forwarded to a representative region and then simulates 500M instructions.

TABLE 1

Configuration of the Simulated System.

| Processor | |
|---|---|
| CPU 4 cores, | X86-64, Out-of-Order, 1.00 GHz |
| L1 Cache | Private, 2 cycles, 23 KB, 2-Way |
| L2 Cache | Private, 20 Cycles, 512 KB, 8-Way |
| L3 Cache | Shared, 32 Cycles, 8 MB, 64-Way |
| Cacheline Size | 64 Byte |
| DDR-based PCM Main Memory | |
| Capacity | 16 GB |
| PCM Latencies | Read 60 ns, Write 150 ns |
| Encryption Parameters | |
| Counter Cache | 256 KB, 8-Way, 64 B Block |
| Merkle Tree Cache | 256 KB, 16-Way, 64 B Block |
| SCT in AGIT | 256 KB |
| SMT in AGIT | 256 KB |
| ST in ASIT | 512 KB |

Evaluation Results

AGIT Performance

To evaluate the AGIT scheme, five schemes were modeled and compared as follows:

Write Back (Baseline): Simple counter mode encryption with write back counter cache and general Bonsai style Merkle Tree cache.

Strict Persistence: This is the strict persistence scheme where the process would persist every modification of the counters, and Merkle Tree nodes up to the root.

Osiris: Stop-loss counter update employed with the write back scheme. Similar to Osiris, the processed use stop-loss limit 4.

AGIT Read: Anubis for General Integrity Tree (AGIT) scheme with write-back and stop-loss counter mode encryption. SCT 636 and SMT 638 are updated at every counter cache and Merkle Tree cache miss.

AGIT Plus: This is an optimized AGIT scheme with write-back and stop-loss counter mode encryption. SCT 636 and SMT 638 are updated whenever the contents of the cache are modified for the first time.

The term "scheme" as referred to herein relates to a method or process of operation to carry-out the functions described herein by way of hardware, software, firmware or a combination of hardware, software and/or firmware. The software includes a set of programming instructions or computer readable instructions that when executed by a processor or controller are configured to perform the acts or functions described herein.

Figure 11A:
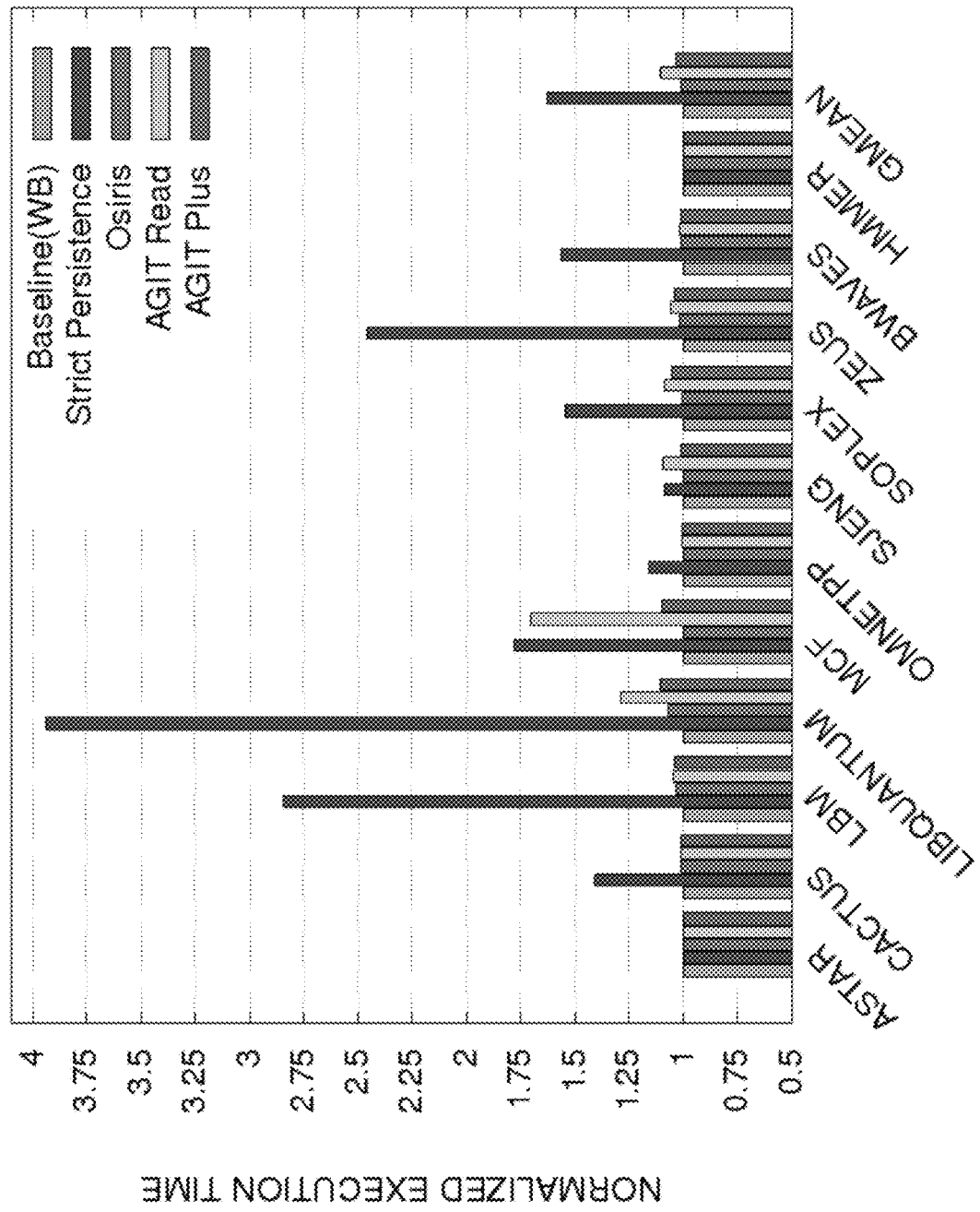
FIG. 11A illustrates a graphical representation of the performance of AGIT scheme compared with other schemes.

FIG. 11A illustrates a graphical representation 1100A of the performance of AGIT scheme compared with other schemes. The Osiris-style stop-loss mechanism adds a few more writes above the write back baseline. This is because most of the counters easily are evicted before they reach the stop-loss limit. The low performance degradation in the Osiris scheme comes at the cost impractical recovery time. The AGIT read scheme adds more overhead on top of the Osiris scheme. However, its overhead is significantly high for applications that are read intensive (e.g. the 429.mcf application). This is because 429.mcf is read-intensive; few counters are actually written/updated in the cache before eviction (as shown earlier in FIG. 7). This phenomenon can be noticed from the near identical performance of Write Back and Osiris for 429.mcf, which means the application is read intensive and evicts the counters long before they cross the stop-loss barrier. LBM is more write intensive than 429.mcf and generates insignificant number of read requests.

Thus, AGIT read overhead is minimal in LBM but demonstrates slightly higher overhead in Osiris since many cache lines are written beyond stop-loss limit. LIBQUANTUM performs both reads and writes more than the rest of the applications (except 429.mcf) and Osiris overhead is highest for LIBQUANTUM since it is the most write intensive application tested.

AGIT Plus scheme is superior in terms of achieving both, low run-time overhead and practical recovery time. On average, AGIT plus adds 3.4% extra overhead over the write-back scheme. The reason for the low overhead for the AGIT-plus scheme is that it may act only upon the lazy update of the shadow table 634, which occurs when a cache line gets modified first. Due to the varying write behavior of the applications, AGIT plus outperforms AGIT Read in the case of the read intensive 429.mcf. However, both schemes show negligible overheads, even for write intensive applications like LIBQUANTUM. AGIT Read and AGIT Plus reduce the overhead by 9.17× and 24.5×, respectively. On average, AGIT Read incurs 10.4% overhead over write-back scheme and reduces overhead of the strict persistence by 5×. AGIT Plus performs even better, incurring approximately 3.4% overhead while reducing 17.4× overhead of strict persistence scheme.

ASIT Performance

For the ASIT scheme, four schemes were modelled. Although, Write Back and Osiris were modelled using an SGX style tree, those schemes that can recover such a tree may include Strict Persistence and ASIT: Write Back: Simple writeback scheme with an SGX style Merkle Tree and counter mode encryption. Strict Persistence: Strict persistence scheme; every update/modification of the counters, and Merkle Tree nodes up to the root are written back to the memory immediately. Osiris: Similar to Osiris scheme modelled in AGIT scheme. ASIT: This is the ASIT scheme working alongside write-back counter mode encryption.

Figure 11B:
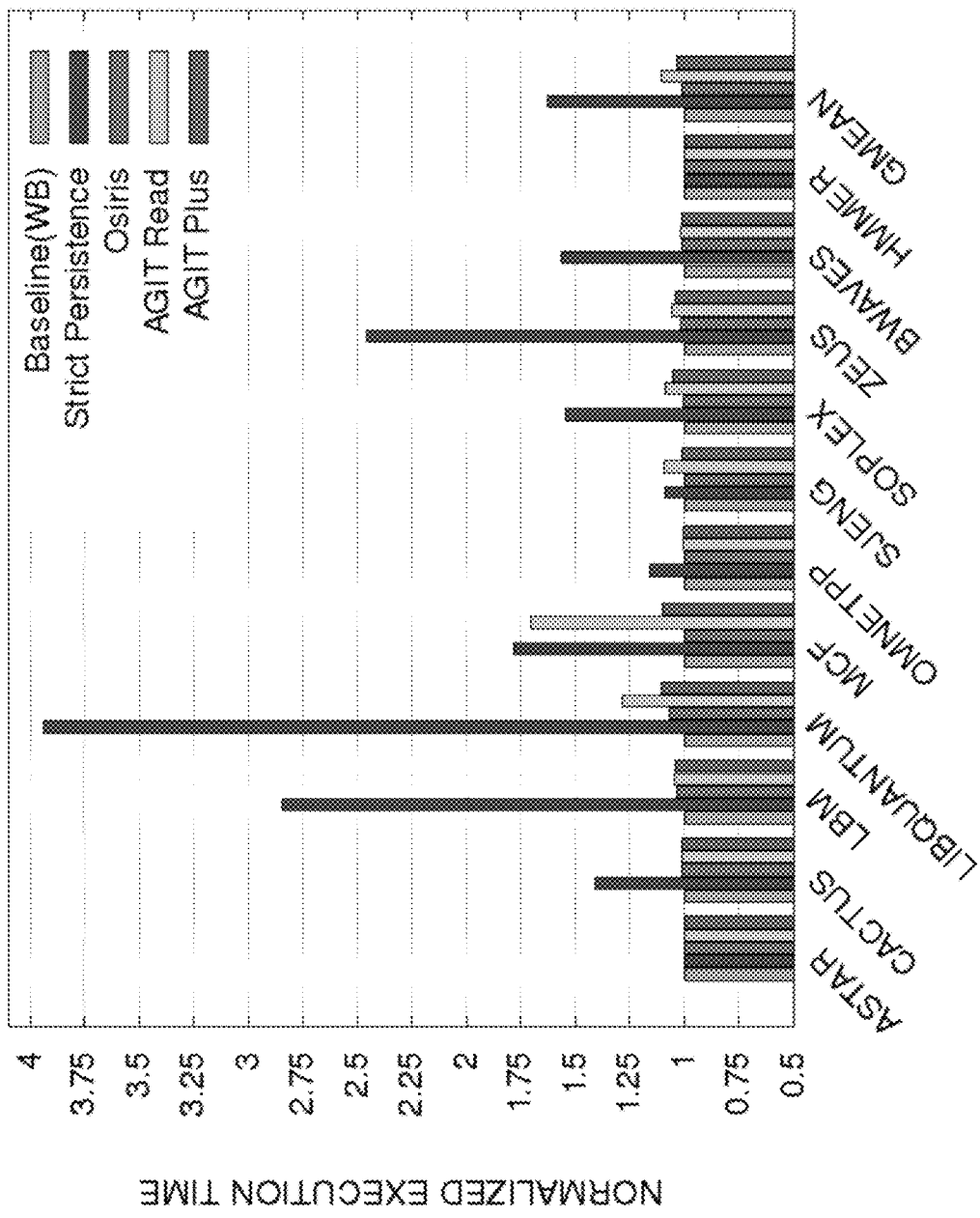
FIG. 11B illustrates a graphical representation of the performance analysis of ASIT scheme.

FIG. 11B illustrates a graphical representation 1100B of the performance analysis of ASIT scheme. The ASIT scheme, due to the nature of parallelizable trees, has to strictly track the meta-data writes in the cache, however, the average overhead is marginal when compared with the scheme that ensures recoverability (strict persistence), 7.9% vs. 63%. The lazy write-back cache policy in the ASIT scheme enables low overhead due to the reduced number of updates to cache, and hence reduced number of shadow memory writes. Compared to the scheme that supports recoverability (strict-persistence), even for write-intensive applications, LIB QUANTUM and LBM, the overheads are reduced approximately by 9× and 10×, respectively. The average overhead is 7.9%, which makes ASIT the first practical scheme that enable recovery of SGX-style trees. In additional to the impractical performance overheads that the strict-persistence incurs, it causes at least an additional ten writes per memory write operation, which can significantly reduce the lifetime of NVMs. In contrast, ASIT may incur one extra write operation per memory write.

Flowchart Processes

All processes and methods in the figures are performed in the order shown or a different order. One or more blocks may be added or omitted. The process or method blocks may be performed contemporaneously.

Figure 12A:
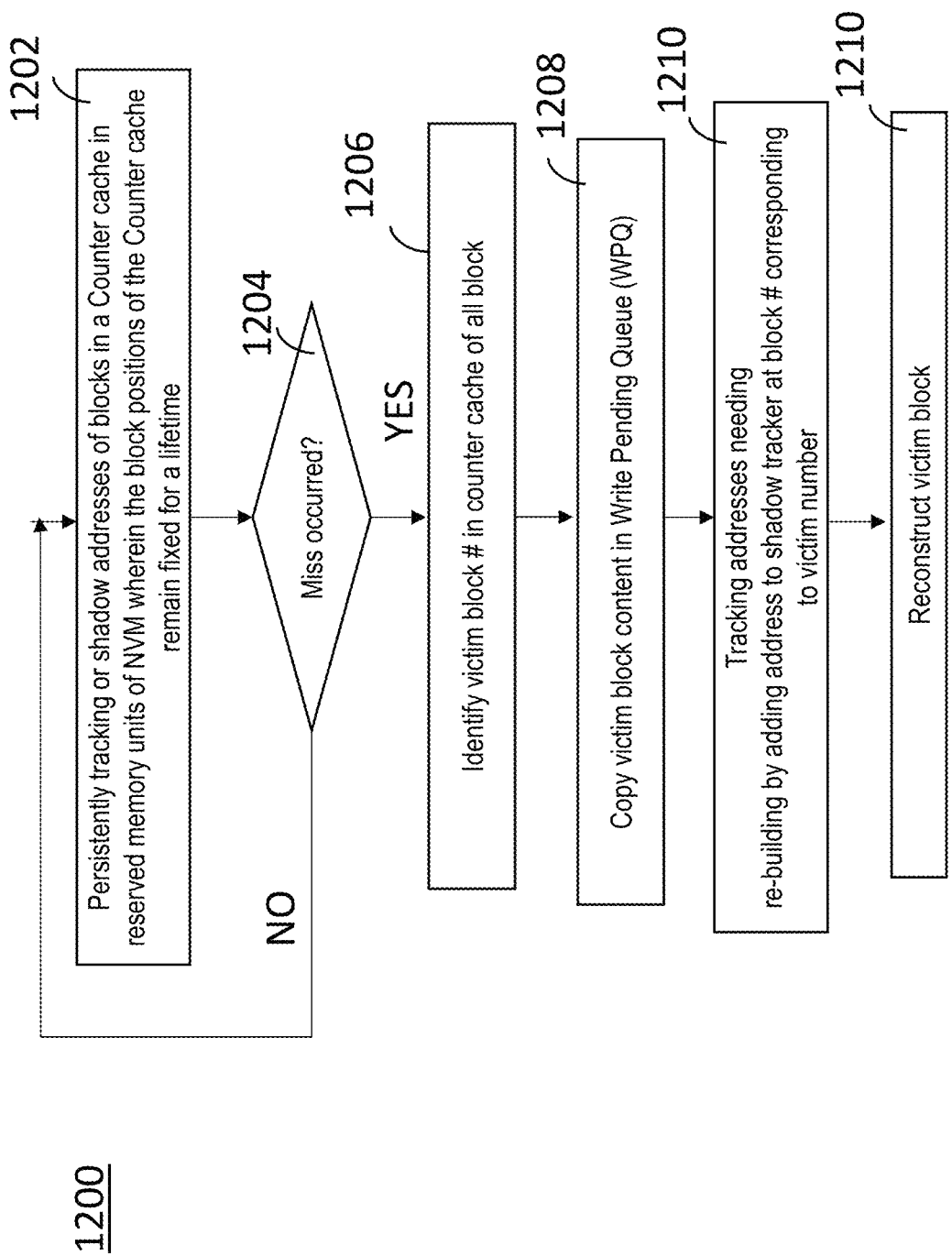
FIG. 12A illustrates a flowchart of a process for ultra-low overhead and recovery time using the memory system with the UL-O&RT device.

FIG. 12A illustrates a flowchart of a process 1200 for ultra-low overhead and recovery time using the memory system 600A with the UL-O&RT device 650. The process (method) 1200 may include, at block 1202, persistently tracking and/or shadowing addresses of blocks in a counter cache in reserved memory units of the NVM device 630, wherein the block positions of the counter cache remain fixed for a lifetime (i.e., operational life).

At block 1204, a determination is made whether a miss occurred. If "NO," the process loops back to a point before block 1202. If the determination is "YES," the process proceeds to block 1206, where the victim block number in the counter cache of all counter cache blocks is identified. At block 1208, the process 1200 copies the victim block content into the write pending queue (WPQ). At block 1209, the process tracks addresses needing re-building (recovery) by adding the address to the shadow tracker, as will be described in relation to FIGS. 12B-12C. The victim block number is offset in the NVM using the same numerology set for its lifetime.

The process (method) 1200 includes a block 1210 to reconstruct or recover the victim block. These recovery processes are described and shown in relation to FIGS. 10A and 10B.

Figure 12B:
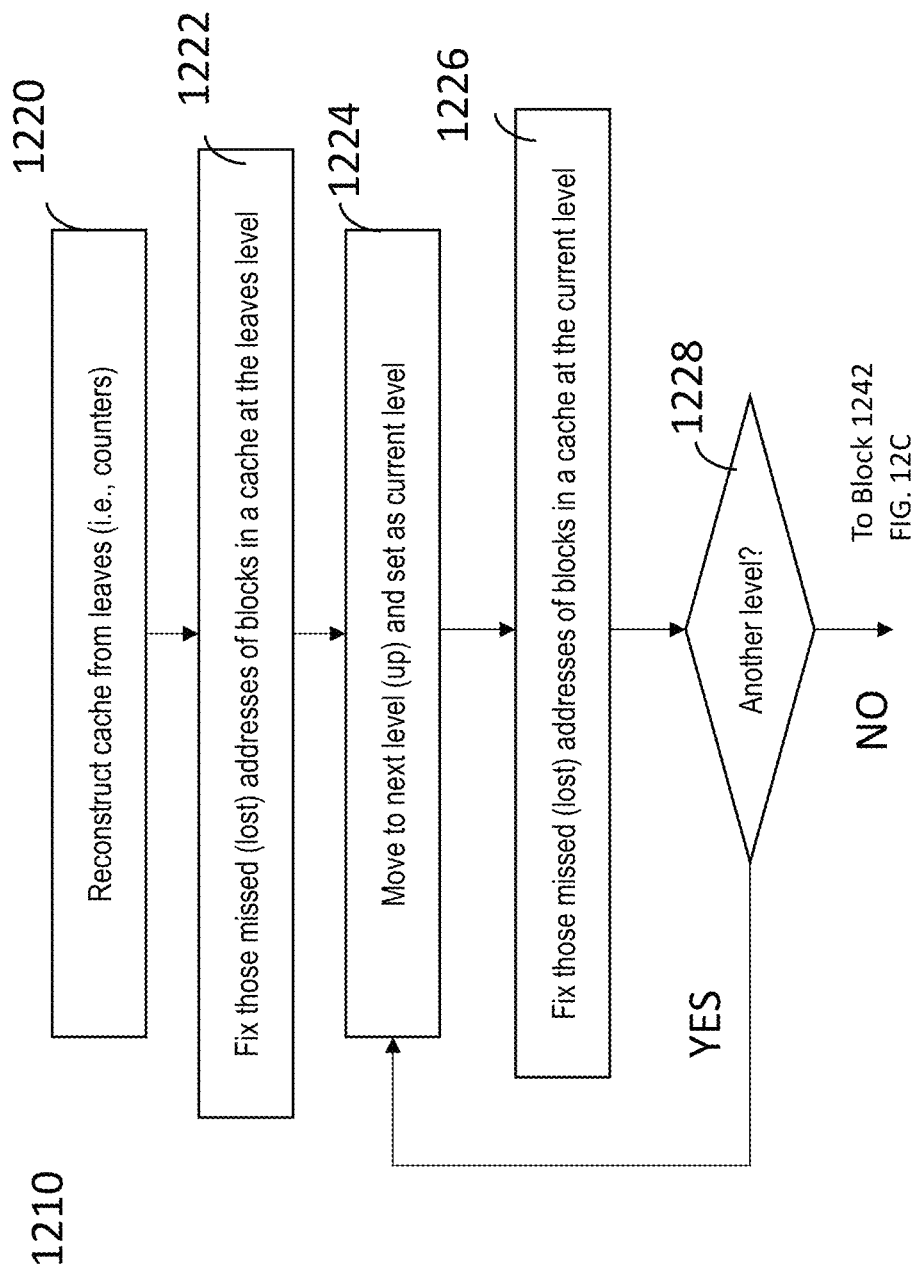
FIGS. 12B-12C illustrates a flowchart of a process for reconstruction using the UL-O&RT device.
Figure 12C:
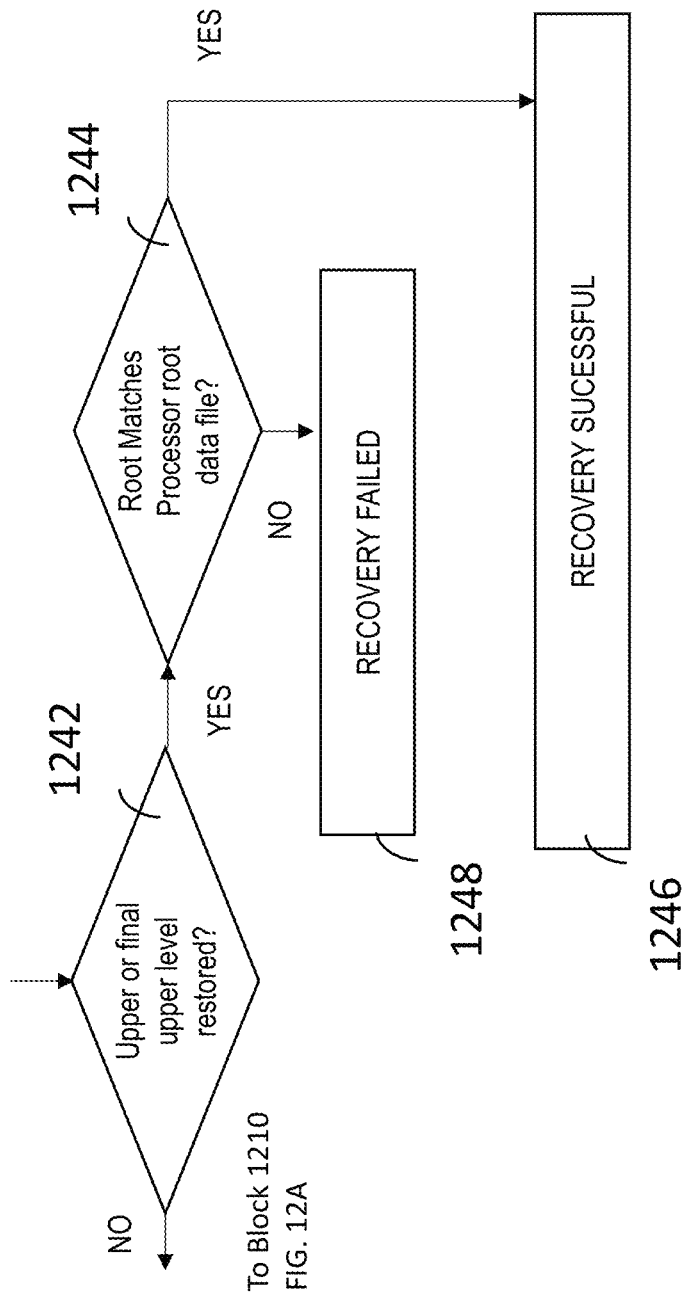

FIGS. 12B-12C illustrate a flowchart of a process (method) 1210 for reconstruction using the UL-O&RT device. The process 1210 may include reconstructing cache from leaves (i.e., counters), at block 1220. The process 1210 may include fixing those missed or lost addresses of a block in a cache at the leave level, at block 1222. The process 1210 may include moving up to a next level of the cache and set as the current level, at block 1224. The process 1210 may include fixing those misses (lost) addresses of a block in a cache at the current level, block 1226. At block 1228, a determination is made whether there is another level. If there "NO," the process 1210 ends. If the determination is "YES," the process 1210 loops back to block 1224 where the process moves up to the next level which is then set to the current level. The process 1210 loop upward though the levels.

At block 1242 of FIG. 12C, a determination is made whether the upper or final level has been restored. If the determination is "YES," a determination is made whether the root matches the processor root data, at block 1244. If "YES," the memory controller will proceed with operations based on the recovered data. as the recovery was successful, block 1246. If "NO," the recovery failed, at block 1248. The memory controller will take corrective action based on a failed recovery.

In some embodiments, the verification of each level counters also relies on the cryptographic hash values stored in their children nodes; the hash value in their children levels are calculated over the counters in that child node and a counter in the upper level, i.e., each upper level counter is used as version number that will be verified by the children hash value and later verified by the hash value of its neighboring counters along with its parent counter. The process continues until all corresponding parent counters are verified, however, if such parent counters exist in the cache, it means they are already verified and thus it is sufficient to stop once the lowest level hit in cache is found Sensitivity Study Recovery Time: Unlike previous models (e.g., Osiris), the recovery time in Anubis schemes is not a linear function of the memory size, i.e., the recovery time does not increase linearly with the increase of the memory size. In the AGIT and ASIT schemes the recovery time is generally a function of the cache size (Counter Cache, Merkle Tree Cache) and the number of levels in the tree.

Figure 13B:
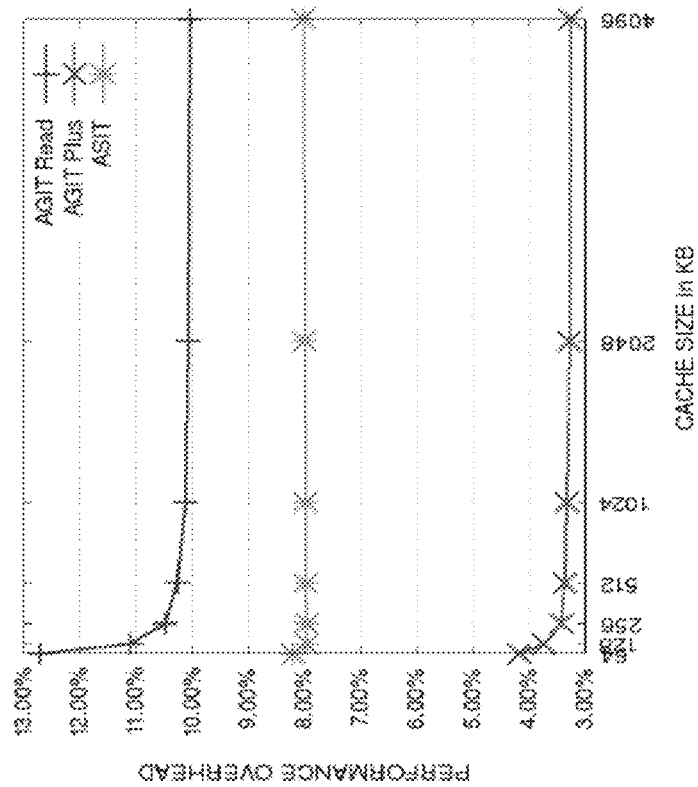
FIG. 13B illustrates a graphical representation of sensitivity of performance based on cache size.
Figure 13A:
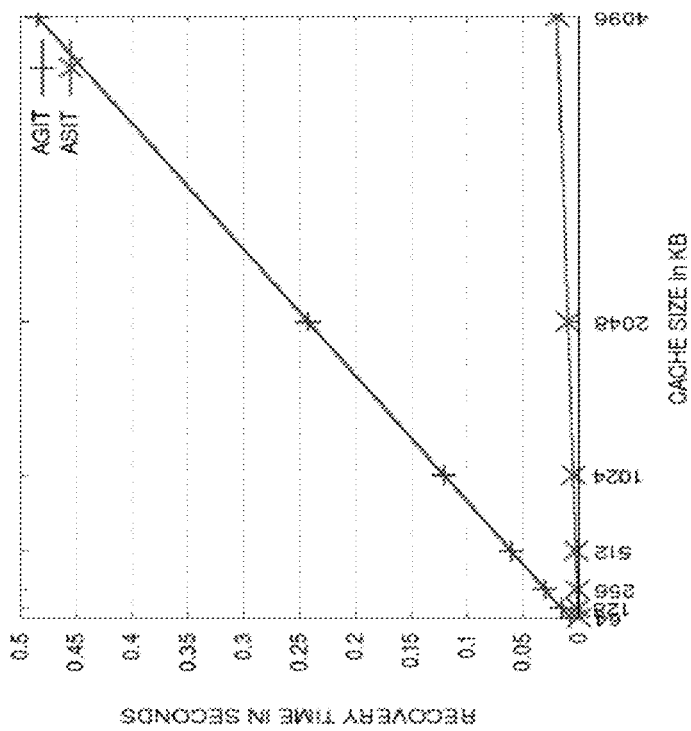
FIG. 13A illustrates a graphical representation of recovery time based on cache size.

FIG. 13A illustrates a graphical representation 1300A of recovery time based on cache size. Specifically, FIG. 13A shows how recovery time increases with the increase in cache size. Along the horizontal axis, both counter cache and Merkle tree cache sizes are increased by the same capacity.

In comparison with the Osiris scheme, the recovery time for 8 TB memory is 28193 seconds (7.8 Hours) as shown in FIG. 5. The Anubis recovery time for extremely large cache sizes (4 MB) is approximately 0.48 s in AGIT, i.e., 58735× faster recovery time.

AGIT recovery time is almost more than double than the ASIT recovery time. This is because, according to the AGIT scheme, each counter block packs 64 counters (as in split counter scheme) each of which requires one encrypted block to be fetched from memory during recovery. SGX style counter cache line (used in ASIT scheme) holds approximately 8 counters. However, ASIT recovery does not rely on the ECC bits and hence requires one read for the shadow block and one read for the affected node from memory during recovery. Besides, during recovery, the ASIT scheme must bring one extra node from memory (if not in the cache) to read the upper counter during MAC generation. Generating hashes and MAC values in ASIT scheme consumes some time but it is negligible compared to the read latency.

Performance sensitivity to Cache Size: FIG. 13B illustrates a graphical representation 1300B of sensitivity of performance based on cache size. The overall performance of each scheme improves with cache size increase. As shown in FIG. 13B, the sensitivity of each of the schemes decreases after a certain level of cache size. Beyond 1 MB, there is no significant improvement in performance with further cache size increases. It should also be noted that, the least sensitive scheme with cache increase is ASIT. Although, the write-back performance of AGIT scheme improves with increase in cache size, the normalized performance improvement of AGIT scheme compared to the baseline (Write Back) almost remains the same. This is because AGIT writes is dependent on the application behavior (number of data writes) rather than the locality in the cache. In the other two schemes (AGIT read and AGIT plus), the performance depends more on the availability of the metadata inside the cache (due to fewer counter reads in an AGIT read with higher cache size, and less eviction in AGIT plus with higher cache size).

Prior work related to Non-Volatile Memory recovery time and crash consistency are described, including Crash-Consistency [8] and Osiris [7]. In Crash Consistency, an API for the programmers was proposed to selectively persist counters and ensure atomicity through a write queue and Ready-Bit. In order to reduce the overhead of ensuring atomicity of all counters, selective counter atomicity makes sure of atomicity of a few counters and does not guarantee atomicity for others. Osiris shows that selective counter atomicity, since not protecting the majority of the counters, could result in replay attacks as stale values of counters may occur for these counters after a crash. Osiris discusses the recoverability of all counters using Error Correcting mechanism (ECC bits) of the NVDIMM. Each data cache line, along with its ECC is encrypted using a counter before stored in the NVM. In addition to that, Osiris introduces stop-loss mechanism for counter update. Combining these two methods, Osiris can recover the counter across crashes since counters are now recoverable from the data itself.

There are several state-of-the-art works related to NVM security and persistence [24], [25], [26], [18], [20], [27], [19], [28], without considering crash-consistency and recovery, that discuss optimization of the run-time overhead of implementing security in Non-Volatile-Memory. Most works employ counter-mode encryption for encrypting data and Merkle Trees for ensuring the integrity. However, the recovery and crash-consistency of integrity protected systems have not been addressed. SecPM [27] proposes a write-through mechanism for counter cache that tries to combine multiple updates of counters to a single write to memory, however does not ensure recovery for SGX and incurs significant recovery time as in Osiris. The embodiments of the invention provide improvements by way of a reduction of recovery time of secure non-volatile memory and recovery mechanism that seamlessly works with different integrity protection schemes.

Conclusion

The Anubis system of the present invention bridges the gap between recoverability and high performance for secure Non-Volatile Memories. The embodiments (methods and UL-O&RT device) may be seamlessly integrated into various secure and integrity protected systems, including Intel's SGX system. Anubis can achieve significant improvement in recovery time and incur approximately 3.4% overhead when implemented in general Merkle Tree protected system, and approximately 7.9% in complicated SGX-like integrity protected system. In addition, Anubis removes the memory size barrier in recovery time and instead makes the recovery time a function of counter cache and Merkle Tree cache size. In summary, with minimal performance overhead, recoverability of complicated trees can be achieved, with a recovery time less than a second. In summary, the embodiments herein improve both recoverability and recovery time of secure NVMs.

The most probable use case for this invention is secure processors that are able to recover from a crash and resume normal operations, including processors, such as those used in data processing centers.

Computational Hardware Overview

Figure 14:
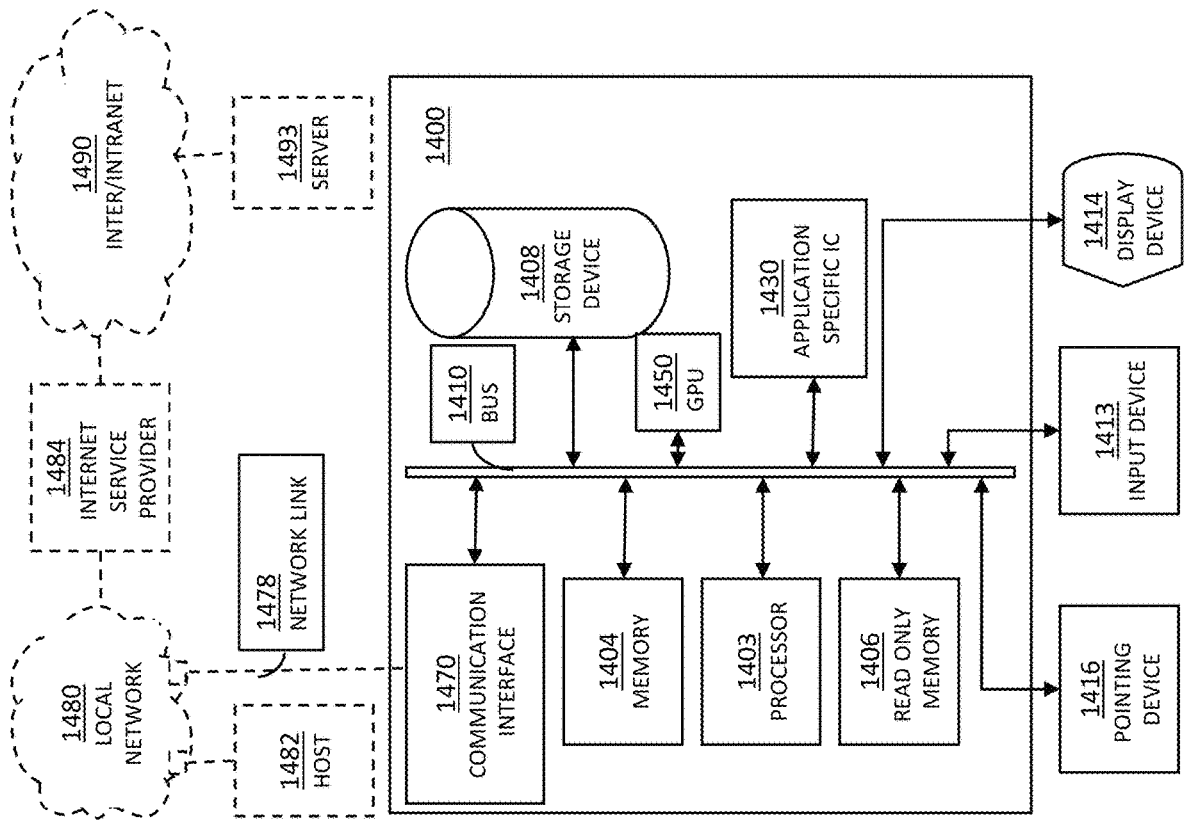
FIG. 14 illustrates a special purposes computer system.

FIG. 14 is a block diagram that illustrates a computer system 1400 (i.e., computing device) upon which an embodiment of the invention may be implemented or employed. The terms computing system and computer system are used interchangeably herein. Computer system 1400 includes a communication mechanism such as a bus 1410 for passing information between other internal and external components of the computer system 1400. The memory controller as described herein has application in computer systems, computing devices and servers. The memory controller device includes interfaces to the NVM device and to the shadow tracker memory region.

Information is represented as physical signals of a measurable phenomenon, typically electrical voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information referred to as analog data is represented by a near continuum of measurable values within a particular range. Computer system 1400, or a portion thereof, constitutes a means for performing one or more blocks of one or more methods described herein. Thus, the computer system is a special purpose computer system.

A sequence of binary digits constitutes digital data that is used to represent a number or code for a character. A bus 1410 includes many parallel conductors of information so that information is transferred quickly among devices coupled to the bus 1410. One or more processors 1403 for processing information are coupled to the bus 1410. A processor 1403 performs a set of operations on information.

The set of operations include bringing information in from the bus 1410 and placing information on the bus 1410. The set of operations also typically include comparing two or more units of information, shifting positions of units of information, and combining two or more units of information, such as by addition or multiplication. A sequence of operations to be executed by the processor 1403 constitutes computer instructions. A graphics processing unit (GPU) 1450 may be coupled to bus 1410.

Computer system 1400 also includes a memory 1404 coupled to bus 1410. The memory 1404, such as a random-access memory (RAM) or another dynamic storage device, stores information including computer instructions. The memory 1404 may also include dynamic memory that allows information stored therein to be changed by the computer system 1400. The RAM allows a unit of information stored at a location called a memory address to be stored and retrieved independently of information at neighboring addresses. The memory 1404 is also used by the processor 1403 to store temporary values during execution of computer instructions. The computer system 1400 also includes a read only memory (ROM) 1406, non-volatile persistent storage device or static storage device coupled to the bus 1410 for storing static information, including instructions, that is not changed by the computer system 1400. The ROM 1406 may be a secure byte-addressable memory (storage) device or a direct-access for files (DAX) memory device. The bus 1410 may also have coupled thereto other storage devices including a non-volatile (persistent) storage device, such as a magnetic disk or optical disk, for storing information, including instructions, that persists even when the computer system 1400 is turned off or otherwise loses power.

Information, including instructions, is provided to the bus 1410 for use by the processor from an external input device 1413, such as a keyboard containing alphanumeric keys operated by a human user, or a sensor. A sensor detects conditions in its vicinity and transforms those detections into signals compatible with the signals used to represent information in computer system 1400. Other external devices coupled to bus 1410, used primarily for interacting with humans, include a display device 1414, such as a cathode ray tube (CRT) or a liquid crystal display (LCD), light emitting diode (LED) displays, for presenting images, and a pointing device 1416, such as a mouse or a trackball or cursor direction keys, for controlling a position of a small cursor image presented on the display device 1414 and issuing commands associated with graphical elements presented on the display 1414. The processor may be coupled to peripheral devices using peripheral drivers.

In the illustrated embodiment, special purpose hardware, such as an application specific integrated circuit (IC) 1430, may be coupled to bus 1410. The special purpose hardware may be configured to perform operations that cannot be performed quickly enough by processor 1403 for special purposes. Examples of application specific ICs include graphics accelerator cards for generating images for display device 1414, cryptographic boards for encrypting and decrypting messages sent over a network, speech recognition devices, and interfaces to special external devices, such as robotic arms and scanning equipment that repeatedly perform some complex sequence of operations that are more efficiently implemented in hardware.

Computer system 1400 also includes one or more instances of a communications interface 1470 coupled to bus 1410. Communication interface 1470 provides a two-way communication coupling to a variety of external devices that operate with their own processors, such as printers, scanners and external disks.

Pointing device 1416, input device 1413 and display device 1414 may be associated with host computer 1482.

In general, the computer system 1400, through the communication interface 1470, may be coupled with a network link 1478 that is connected to a local network 1480 to which a variety of external devices with their own processors are connected. In some embodiments, the local network 1480 may be a private network and may include wired and/or wireless communications. For example, communication interface 1470 may comprise a parallel port or a serial port or a universal serial bus (USB) port on a personal computer. In some embodiments, communications interface 1470 is an integrated services digital network (ISDN) card or a digital subscriber line (DSL) card or a telephone modem that provides an information communication connection to a corresponding type of telephone line. In some embodiments, a communication interface 1470 may be a cable modem that converts signals on bus 1410 into signals for a communication connection over a coaxial cable or into optical signals for a communication connection over a fiber optic cable. As another example, communications interface 1470 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 1470 sends and receives electrical, acoustic or electromagnetic signals, including infrared and optical signals, that carry information streams, such as digital data.

The term computer-readable medium is used herein to refer to any medium that participates in providing information to processor 1403, including instructions for execution. Such a medium may take many forms, including, but not limited to, non-volatile media, volatile media and transmission media. Non-volatile media include, for example, optical or magnetic disks, such as storage device. Volatile media include, for example, dynamic memory 1404. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 1403, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 1403, except for carrier waves and other signals.

Logic encoded in one or more tangible media includes one or both of processor instructions on a computer-readable storage media and special purpose hardware, such as ASIC 1430.

Network link 1478 typically provides information communication through one or more networks to other devices that use or process the information. For example, network link 1478 may provide a connection through a private or local network 1480 to a host computer 1482, such as a secure host computer. For example, in some embodiments, the pilot may be located at the host computer 1482. Thus, the user interfaces referenced in FIG. 14, may be located with the host computer 1482.

In some embodiments, the computer system 1400 may connect to equipment 1484 operated by an Internet Service Provider (ISP) or Intranet Service Provider. ISP equipment 1484 in turn provides data communication services through the public, world-wide packet-switching communication network of networks now commonly referred to as the Internet 1490 or alternately over an Intranet. A computer called a server 1493 connected to the Internet or Intranet provides a service in response to information received over the Internet or Intranet. For example, server 1493 provides information representing video data for presentation at display 1414 or the server may receive information representing video data.

The embodiments related to the use of computer system 1400 for implementing the techniques described herein. According to one embodiment, those techniques are performed by computer system 1400 in response to processor 1403 executing one or more sequences of one or more instructions contained in memory 1404 to form a computer program product. Such instructions, also called software and program code, may be read into memory 1404 from another computer-readable medium such as storage device 1408. Execution of the sequences of instructions contained in memory 1404 causes processor 1403 to perform one or more of the method blocks described herein. In alternative embodiments, hardware, such as an application specific integrated circuit 1430, may be used in place of or in combination with software to implement the embodiments. Thus, embodiments are not limited to any specific combination of hardware and software.

Computer program code for carrying out operations described above may be written in a variety of programming languages, including but not limited to a high-level programming language, such as without limitation, C or C++, for development convenience. In addition, computer program code for carrying out operations of embodiments described herein may also be written in other programming languages, such as, but not limited to, interpreted languages. The program code may include hardware description language (HDL) or very high speed integrated circuit (VHSIC) hardware description language, such as for firmware programming. Some modules or routines may be written in assembly language or even micro-code to enhance performance and/or memory use. It will be further appreciated that the functionality of any or all of the program modules may also be implemented using discrete hardware components, one or more application specific integrated circuits (ASICs), or a programmed Digital Signal Processor (DSP) or microcontroller. A code in which a program of the embodiments is described can be included as a firmware in a RAM, a ROM and a flash memory. Otherwise, the code can be stored in a non-transitory, tangible computer-readable storage medium such as a magnetic tape, a flexible disc, a hard disc, a compact disc, a photo-magnetic disc, a digital versatile disc (DVD) or the like.

The signals transmitted over network link 1478 and other networks through communications interface 1470, carry information to and from computer system 1400. Computer system 1400 can send and receive information, including program code, through the networks 1480, 1490 among others, through network link 1478 and communications interface 1470. In an example using the Internet 1490, a server 1492 transmits program code for a particular application, requested by a message sent from computer 1400, through Internet 1490, ISP equipment 1484, local network 1480 and communications interface 1470. The received code may be executed by processor 1403 as it is received or may be stored in storage device 1408 or other non-volatile storage for later execution, or both. In this manner, computer system 1400 may obtain application program code in the form of a signal on a carrier wave.

Various forms of computer readable media may be involved in carrying one or more sequence of instructions or data or both to processor 1403 for execution. For example, instructions and data may initially be carried on a magnetic disk of a remote computer such as host computer 1482. The remote computer loads the instructions and data into its dynamic memory and sends the instructions and data over a telephone line using a modem. A modem local to the computer system 1400 receives the instructions and data on a telephone line and uses an infra-red transmitter to convert the instructions and data to a signal on an infra-red a carrier wave serving as the network link 1478. An infrared detector serving as communications interface 1470 receives the instructions and data carried in the infrared signal and places information representing the instructions and data onto bus 1410. Bus 1410 carries the information to memory 1404 from which processor 1403 retrieves and executes the instructions using some of the data sent with the instructions. The instructions and data received in memory 1404 may optionally be stored on storage device 1408, either before or after execution by the processor 1403.

The memory 1404 may have stored thereon applications implemented as software or computer instructions. The applications when executed by the processor 1403 may perform one or more functions and steps as described herein.

Unless otherwise defined, all terms (including technical and scientific terms) used herein have the same meaning as commonly understood by one of ordinary skill in the art to which embodiments belongs. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

In particular, unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such data storage, transmission or display devices.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the Abstract set forth herein, is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

This application incorporates herein by reference, M. Ye, C. Hughes, and A. Awad, "Osiris: A low-cost mechanism to enable restoration of secure non-volatile memories," in 51st Annual IEEE/ACM International Symposium on Microarchitecture (MICRO 2018), 2018.

This application incorporates herein by reference, K. Zubair and A. Awad. "Anubis*: Ultra-low overhead and recovery time for secure non-volatile memories."

The following references are incorporated herein by reference in their entirety.

B. C. Lee, P. Zhou, J. Yang, Y. Zhang, B. Zhao, E. Ipek, O. Mutlu, and C. Burger, "Phase-change technology and the future of main memory," *IEEE Micro*, vol. 30, pp. 143-143, January 2010.

Z. Li, R. Zhou, and T. Li, "Exploring high-performance and energy proportional interface for phase change memory systems," in *Proceedings of the 2013 IEEE 19th International Symposium on High Performance Computer Architecture (HPCA)*, HPCA '13, (Washington, D.C., USA), pp. 210-221, IEEE Computer Society, 2013.

T.-Y. L. et al., "A 130.7 mm2 2-layer 32 gb reram memory device in 24 nm technology," in *IEEE International Solid-State Circuits Conference Digest of Technical Papers*, 2013.

J. Y. P. Zhou, B. Zhao and Y. Zhang, "A durable and energy efficient main memory using phase change memory technology," in 36*th annual international symposium on Computer architecture—ISCA '09*, 2009.

E. C. et al., "Advances and future prospects of spin-transfer torque random access memory," in *IEEE Transactions on Magnetics*, June 2010.

M. P. B. R. Chenyu Yan, D. Englender and Y. Solihin, "Improving cost, performance, and security of memory encryption and authentication," in 33*rd International Symposium on Computer Architecture, ISCA '06*, 2006.

M. Ye, C. Hughes, and A. Awad, "Osiris: A low-cost mechanism to enable restoration of secure non-volatile memories," in 51*st Annual IEEE/ACM International Symposium on Microarchitecture (MICRO 2018)*, 2018. (Appendix A incorporated herein).

J. R. S. Liu, A. Kolli and S. Khan, "Crash consistency in encrypted non-volatile main memory systems," in 2018 *IEEE International Symposium on High Performance Computer Architecture (HPCA)*, 2018.

M. P. B. Rogers, S. Chhabra and Y. Solihin, "Using address independent seed encryption and bonsai merkle trees to make secure processors os- and performance-friendly," in 40*th Annual IEEE/ACM International Symposium on Microarchitecture (MICRO 2007)*, 2007.

"Enhancing High-Performance Computing with Persistent Memory Technology." https://software.intel.com/en-us/articles/enhancing-high-performance-computing-with-persistent-memory-technology. Accessed: 2018 Dec. 7.

"Amazon.com Goes Down, Loses $66,240 Per Minute." https://www.forbes.com/sites/kellyclay/2013/08/19/amazon-com-goes-down-loses-66240-per-minute/#68dc6b6b495c. Accessed: 2019 Feb. 19.

A. Awad, P. Manadhata, S. Haber, Y. Solihin, and W. Horne, "Silent shredder: Zero-cost shredding for secure non-volatile main memory controllers," in *ACM SIGARCH Computer Architecture News*, vol. 44, pp. 263-276, ACM, 2016.

A. Ruddof, "Deprecating the pcommit instruction," 2016.

S. J. Edirisooriya, S. R. Nagesh, B. R. Monson, and P. Kumar, "Method and apparatus for completing pending write requests to volatile memory prior to transitioning to self-refresh mode," Feb. 9, 2017. U.S. patent application Ser. No. 14/816,445.

N. Binkert, S. Sardashti, R. Sen, K. Sewell, M. Shoaib, N. Vaish, M. D. Hill, D. A. Wood, B. Beckmann, G. Black, S. K. Reinhardt, A. Saidi, A. Basu, J. Hestness, D. R. Hower, and T. Krishna, "The gem5 simulator," *ACM SIGARCH Computer Architecture News*, vol. 39, p. 1, August 2011.

J. L. Henning, "SPEC CPU2006 benchmark descriptions," *ACM SIGARCH Computer Architecture News*, vol. 34, pp. 1-17, September 2006.

S. Gueron, "A memory encryption engine suitable for general purpose processors." Cryptology ePrint Archive, Report 2016/204, 2016. https://eprint.iacr.org/2016/204.

M. Taassori, A. Shafiee, and R. Balasubramonian, "Vault: Reducing paging overheads in sgx with efficient integrity verification structures," in *Proceedings of the Twenty-*

*Third International Conference on Architectural Support for Programming Languages and Operating Systems*, pp. 665-678, 2018.

G. Saileshwar, P. J. Nair, P. Ramrakhyani, W. Elsasser, J. A. Joao, and M. K. Qureshi, "Morphable counters: Enabling compact integrity trees for low-overhead secure memories," in *Microarchitecture (MICRO)*, 2018 51*st* Annual IEEE/ACM International Symposium on, 2018.

G. Saileshwar, P. J. Nair, P. Ramrakhyani, W. Elsasser, and M. K. Qureshi, "Synergy: Rethinking secure-memory design for error-correcting memories," in *High Performance Computer Architecture (HPCA)*, 2018 *IEEE International Symposium on*, pp. 454-465, IEEE, 2018.

M. M. Swift, "Towards o(1) memory," in *Proceedings of the 16th Workshop on Hot Topics in Operating Systems*, HotOS '17, (New York, N.Y., USA), pp. 7-11, ACM, 2017.

B. C. Lee, E. Ipek, O. Mutlu, and D. Burger, "Architecting phase change memory as a scalable dram alternative," in *ACM SIGARCH Computer Architecture News*, vol. 37, pp. 2-13, ACM, 2009.

J. L. Henning, "Spec cpu2006 benchmark descriptions," *ACM SIGARCH Computer Architecture News*, vol. 34, no. 4, pp. 1-17, 2006.

J. Coburn, A. M. Caulfield, A. Akel, L. M. Grupp, R. K. Gupta, R. Jhala, and S. Swanson, "Nv-heaps: Making persistent objects fast and safe with next-generation, non-volatile memories," *SIGPLAN Not.*, vol. 46, pp. 105-118, March 2011.

J. Zhao, S. Li, D. H. Yoon, Y. Xie, and N. P. Jouppi, "Kiln: Closing the performance gap between systems with and without persistence support," in *Proceedings of the 46th Annual IEEE/ACM International Symposium on Microarchitecture*, MICRO-46, (New York, N.Y., USA), pp. 421-432, ACM, 2013.

A. Kolli, V. Gogte, A. Saidi, S. Diestelhorst, P. M. Chen, S. Narayanasamy, and T. F. Wenisch, "Language-level persistency," in *Computer Architecture (ISCA)*, 2017 *ACM/IEEE 44th Annual International Symposium on*, pp. 481-493, IEEE, 2017.

P. Zuo and Y. Hua, "Secpm: a secure and persistent memory system for non-volatile memory," in 10*th USENIX Workshop on Hot Topics in Storage and File Systems (HotStorage 18)*, (Boston, Mass.), USENIX Association, 2018.

J. Ren, J. Zhao, S. Khan, J. Choi, Y. Wu, and O. Mutlu, "Thynvm: Enabling software-transparent crash consistency in persistent memory systems," in *Proceedings of the 48th International Symposium on Microarchitecture*, MICRO-48, (New York, N.Y., USA), pp. 672-685, ACM, 2015.

We claim:

1. A memory system comprising:
   non-volatile memory (NVM) device for storing metadata in a metadata memory region, the NVM device further comprising a shadow tracker memory region; and
   a memory controller coupled to the NVM device for recovering a metadata cache comprising a plurality of cache blocks and configured to:
   persistently track a memory address of metadata in each block of the metadata cache in the shadow tracker memory region;
   when a cache miss occurs in a block of the metadata cache, identify the block with the cache miss as a victim block within the metadata cache in which the miss occurs;
   determine a memory address of the victim block in the metadata cache and store the memory address of the victim block in the shadow tracker memory region in a location corresponding to the victim block; and
   insert a new cache block at the address in the metadata cache;
   wherein the shadow tracker memory region correctly identifies a memory address for each cache block in the metadata cache.

2. The system of claim 1, wherein each cache block has an assigned corresponding location in the shadow tracker memory region.

3. The system of claim 1, wherein the metadata cache comprises a security metadata cache.

4. The system of claim 3, wherein the security metadata cache comprises an encryption counter cache and a Merkle Tree cache.

5. The system of claim 4, wherein the Merkle Tree cache comprises one of a parallelizable tree and a non-parallelizable tree.

6. The system of claim 1, wherein
   the memory controller copies metadata to internal persistent registers which are then inserted into a write pending queue, and
   wherein the write pending queue copies the metadata to the metadata memory region when a crash occurs.

7. The system of claim 1, wherein the controller is further configured to update the persistently tracked memory addresses using a lazy update scheme to reduce a number of memory writes to the shadow tracker memory region.

8. The system of claim 1, wherein a cache replacement policy associated with the metadata cache determines the victim block.

9. The system of claim 1, wherein when a crash occurs causing the metadata in certain blocks of the metadata cache to be lost, the metadata in each lost block of the metadata cache is recovered by using the memory addresses stored in the shadow tracker memory region.

10. The system of claim 1, wherein the memory controller is further configured to rebuild affected parts of the metadata cache associated with the persistent memory addresses in the shadow tracker memory region.

11. The system of claim 1, wherein when rebuilding, the memory controller further configured to verify counters of each level of a Merkle Tree by relying on cryptographic hash values stored in their respective children nodes, wherein the hash values in their respective children nodes are calculated over the counters in that child node and a counter in a next upper level.

12. The system of claim 11, wherein when rebuilding, the memory controller further configured to repeat the verification of the counters until all corresponding parent counters are verified and if the parent counters exist in the cache verification is stopped by the memory controller once the lowest level hit in the cache is found.

13. The system of claim 1, wherein the memory controller further configured to:
   generate a persistent copy of content of the metadata cache to form a shadow copy in a shadow cache;
   restore the metadata cache by copying back the shadow cache, after verifying integrity of the shadow cache;
   on each modification to contents of the metadata cache, update a shadow table in the shadow cache with cache lines modified in the metadata cache;
   use a lazy update scheme wherein only one block in the shadow table is updated on each memory write operation;

protect integrity of the shadow table using a Merkle Tree with its root persistent within a processor; and update the Merkle Tree with an eager update scheme such that the root of the Merkle Tree associated with the shadow table reflects a most recent state of the shadow table.

14. A device comprising:

a memory controller coupled to a non-volatile memory (NVM) device having a shadow tracker memory region and configured to:

persistently track NVM memory addresses of cache blocks in a security metadata cache in the shadow tracker memory region;

track the persistent memory addresses after a crash; and rebuild any blocks of the security metadata cache affected by the crash, using the persistent memory addresses in the shadow tracker memory region.

15. The device of claim 14, wherein the security metadata cache comprises a counter cache and a Merkle Tree cache.

16. The device of claim 14, wherein the Merkle Tree cache comprises one of a parallelizable tree and a non-parallelizable tree.

17. The system of claim 14, wherein the memory controller being further configured to update the persistently tracked NVM memory addresses using a lazy update scheme to reduce a number of memory writes to the shadow tracker memory region.

18. The device of claim 14, wherein the controller further configured to update the persistently tracked address blocks of the security metadata cache using a lazy update scheme to reduce a number of memory writes to the shadow tracker memory region.

19. The system of claim 14, wherein each cache block has an assigned corresponding location in the shadow tracker memory region.

20. A memory system comprising:

non-volatile memory (NVM) device for storing information in an information memory region, the NVM device further comprising a shadow tracker memory region; and a memory controller coupled to the NVM device for recovering an information cache comprising a plurality of blocks and configured to:

persistently track memory addresses of information in each block of the information cache in the shadow tracker memory region;

when a cache miss occurs in a block of the information cache, identify the block with the cache miss as a victim block within the information cache;

determine a memory address of the victim block and store this address in the shadow tracker memory region in a location corresponding to the victim block; and insert a new block in the information cache at the memory address of the victim block; and wherein the shadow tracker memory region correctly identifies a memory address for each cache block of the plurality of blocks.

* * * * *